United States Patent
Cheng et al.

(10) Patent No.: US 11,372,759 B2
(45) Date of Patent: Jun. 28, 2022

(54) DIRECTORY PROCESSING METHOD AND APPARATUS, AND STORAGE SYSTEM

(71) Applicant: HUAWEI TECHNOLOGIES CO., LTD., Guangdong (CN)

(72) Inventors: Yongbo Cheng, Chengdu (CN); Chenghong He, Shenzhen (CN); Tao He, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/932,318

(22) Filed: Jul. 17, 2020

(65) Prior Publication Data

US 2020/0349078 A1  Nov. 5, 2020

Related U.S. Application Data

(63) Continuation of application No. PCT/CN2018/099025, filed on Aug. 6, 2018.

(30) Foreign Application Priority Data

Jan. 19, 2018 (CN) .......................... 201810053677.X

(51) Int. Cl.
*G06F 12/08* (2016.01)
*G06F 12/0817* (2016.01)
(Continued)

(52) U.S. Cl.
CPC .......... *G06F 12/0824* (2013.01); *G06F 9/542* (2013.01); *G06F 12/082* (2013.01);
(Continued)

(58) Field of Classification Search
CPC ............... G06F 12/0824; G06F 12/082; G06F 12/0891; G06F 12/0895; G06F 9/542; G06F 12/0813; G06F 12/0817; G06F 2212/7201
See application file for complete search history.

(56) References Cited

U.S. PATENT DOCUMENTS 6,868,485 B1    3/2005  Conway
2003/0005236 A1 1/2003  Arimilli et al.
(Continued)

FOREIGN PATENT DOCUMENTS

CN    101944068 A    1/2011
CN    103500108 A    1/2014
(Continued)

OTHER PUBLICATIONS

Wang Endong et al. Directory Cache Design for Multi-Core Processor, Journal of Computer Research and Development, 52(6):1242-1253,2015.With English abstract.

*Primary Examiner* — Pierre Michel Bataille
(74) *Attorney, Agent, or Firm* — Womble Bond Dickinson (US) LLP

(57) ABSTRACT

A directory processing method and apparatus are provided to resolve a problem that a directory occupies a relatively large quantity of caches in an existing directory processing solution. The method includes: receiving, by a first data node, a first request sent by a second data node; searching for, by the first data node, a matched directory entry in a directory of the first data node based on tag information and index information in a first physical address; creating, when no matched directory entry is found, a first directory entry of the directory based on the first request, where the first directory entry includes the tag information, first indication information, first pointer information, and first status information, the first pointer information is used to indicate that data in (Continued)

the memory address corresponding to the indication bit that is set to valid is read by the second data node.

17 Claims, 9 Drawing Sheets

(51) Int. Cl.
*G06F 9/54* (2006.01)
*G06F 12/0891* (2016.01)
*G06F 12/0895* (2016.01)

(52) U.S. Cl.
CPC ...... *G06F 12/0891* (2013.01); *G06F 12/0895* (2013.01); *G06F 2212/7201* (2013.01)

(56) References Cited

U.S. PATENT DOCUMENTS

| | | | | |
|---|---|---|---|---|
| 2004/0068620 | A1* | 4/2004 | Van Doren | G06F 12/084 |
| | | | | 711/144 |
| 2004/0148472 | A1* | 7/2004 | Barroso | G06F 12/0817 |
| | | | | 711/E12.027 |
| 2012/0159080 | A1* | 6/2012 | Donley | G06F 12/0806 |
| | | | | 711/141 |
| 2016/0092359 | A1 | 3/2016 | Busaba et al. | |
| 2017/0315916 | A1 | 11/2017 | Cheng et al. | |
| 2018/0365153 | A1* | 12/2018 | Jacobi | G06F 12/0895 |
| 2019/0236011 | A1* | 8/2019 | Dropps | G06F 12/0811 |

FOREIGN PATENT DOCUMENTS

| | | |
|---|---|---|
| CN | 103970678 A | 8/2014 |
| CN | 104899160 A | 9/2015 |
| CN | 106776366 A | 5/2017 |
| CN | 107315694 A | 11/2017 |
| CN | 107341114 A | 11/2017 |
| CN | 107368435 A | 11/2017 |

* cited by examiner

| Tag information (Tag) | Index information (Index) | First associated address information (Asso) |
|---|---|---|

| Tag information (Tag) | First indication information | First status information (Sta) | First pointer information (Ptr) |
|---|---|---|---|

| Tag information (Tag) | vld0 (Valid) | vld1 (Valid) | vld2 | vld3 | Status information Sta (E) | Pointer information Ptr (P2) |
|---|---|---|---|---|---|---|

| Tag information (Tag) | vld0 | vld1 | vld2 (Valid) | vld3 | Status information Sta (S) | Pointer information Ptr (P2) |
|---|---|---|---|---|---|---|

| Tag information (Tag) | vld0 | vld1 | vld2 | vld3 (Valid) | Status information Sta | Pointer information Ptr (P3) |
|---|---|---|---|---|---|---|

| Tag information (Tag) | Index information (Index) | Associated address information (Asso) |
|---|---|---|
| TagA | IndexA | AssoA2 |

| Tag information (Tag) | vld0 | vld1 | vld2 | vld3 | Status information (sta) | Pointer information (ptr) |
|---|---|---|---|---|---|---|
| TagA | 1 | 0 | 1 | 0 | E | P1 |
| 27b | 1b | 1b | 1b | 1b | 2b | 8b |

FIG. 15

| Tag information (Tag) | Index information (Index) | Associated address information (Asso) |
|---|---|---|
| TagA | IndexA | AssoA1 |

| Tag information (Tag) | vld0 | vld1 | vld2 | vld3 | Status information (sta) | Pointer information (ptr) |
|---|---|---|---|---|---|---|
| TagA | 0 | 1 | 0 | 0 | E | P3 |

FIG. 16

DIRECTORY PROCESSING METHOD AND APPARATUS, AND STORAGE SYSTEM

CROSS-REFERENCE TO RELATED APPLICATIONS

This application is a continuation of International Application No. PCT/CN2018/099025, filed on Aug. 6, 2018, which claims priority to Chinese Patent Application No. 201810053677.X, filed on Jan. 19, 2018. The disclosures of the aforementioned applications are hereby incorporated by reference in their entireties.

TECHNICAL FIELD

Embodiments of this application relate to the field of storage technologies, and in particular, to a directory processing method and apparatus, and a storage system.

BACKGROUND

In the field of storage technologies, to share data between a plurality of data nodes, the plurality of data nodes usually share a memory. For example, in a distributed shared memory (DSM) system shown in FIG. 1, nodes 1 to n share a same storage space (shared memory), and each node may represent a device having a storage function. For another example, a processor of a computer device shown in FIG. 2 includes a plurality of processor cores, and a private cache and a dual-inline-memory-module (DIMM) are allocated to each processor core. The DIMM may be considered as a shared memory, and the processor core may access a DIMM of another processor core over an integrated computer network (ICN).

In an example of the computer device shown in FIG. 2, the processor core may access the DIMM of the another processor core over the ICN, for example, a processor core 2 may access a DIMM of a processor core 1, and therefore the processor core 2 may modify data in the DIMM of the processor core 1, and the modified data is stored in a private cache of the processor core 2. In other words, the DIMM of the processor core 1 does not store a latest version of the data. In this case, if another processor core (for example, a processor core n) requests to access the data, the processor core 1 may determine, based on a directory stored in a private cache of the processor core 1, that the data has been accessed by the processor core 2, and instruct the processor core n to initiate listening to the processor core 2, to obtain the latest version of the data. The directory stored in the private cache of the processor core 1 records the case in which the data stored in the DIMM of the processor core 1 is accessed by another processor core.

FIG. 3 shows a form of a directory stored in a cache of a data node in the prior art. The directory includes m sets, and each set includes n ways. A set may be understood as a row vector of the directory, and a way may be understood as a column vector of the directory. It can be easily learned that the directory includes n×m data blocks, and each block represents a directory entry. Each directory entry includes tag information tag, status information Sta, and pointer information Ptr. The tag is used to match a directory entry, the Sta indicates a status (for example, a shared state or an exclusive state) of data corresponding to the directory entry, and the Ptr indicates a data node that accesses the data corresponding to the directory entry. When a data node receives a request for reading data in a physical address (PA), the data node first searches the directory based on index information Index in the PA, to determine a set that matches the Index in the m sets; then the data node determines, based on tag information tag in the PA, a directory entry that matches the tag in the set, to determine a directory entry that matches the request; and then, a data node that accesses the data and a status of the data may be determined by using Sta and Ptr in the matched directory entry. For example, when the Sta is E (namely, exclusive) and the Ptr is P1, it indicates that the data is exclusively occupied by the processor core 1 (P1).

In the foregoing solution, if all data in a plurality of memory addresses is accessed by another data node, a directory entry needs to be created for each memory address. Consequently, the directory occupies a relatively large quantity of caches, and resources are wasted.

In conclusion, in a directory processing solution provided in the prior art, a directory occupies a relatively large quantity of caches, thereby causing a resource waste.

SUMMARY

Embodiments of this application provide a directory processing method and apparatus, and a storage system, to resolve a problem of a resource waste caused because a directory occupies a relatively large quantity of caches in the foregoing directory processing solution.

According to a first aspect, an embodiment of this application provides a directory processing method. The method includes the following operations: receiving, by a first data node, a first request sent by a second data node, where the first request is used to indicate that the second data node requests to read first data in a first physical address, the first physical address includes tag information, index information, and first associated address information, the first associated address information is used to indicate that the first physical address corresponds to a first memory address in N (N is greater than 1) memory addresses of a memory of the first data node; searching for, by the first data node, a matched directory entry in a directory of the first data node based on the tag information and the index information; and then, creating, by the first data node when no matched directory entry is found, a first directory entry of the directory based on the first request.

The first directory entry includes four parts: the tag information, first indication information, first pointer information, and first status information. The first indication information includes N indication bits that are in one-to-one correspondence with the N memory addresses, a first indication bit corresponding to the first memory address in the N indication bits is set to valid, and the other indication bits other than the first indication bit are set to invalid. The first pointer information is used to indicate that data in the memory address corresponding to the indication bit that is set to valid in the first indication information is read by the second data node.

In the foregoing solution, the created first directory entry includes the first indication information, the first indication information includes the N indication bits, and the data in the memory address corresponding to the indication bit that is set to valid in the N indication bits is accessed by the second data node. Therefore, the first directory entry not only can record a case in which the data in the first memory address is accessed by the second data node, but also can record a case in which another memory address other than the first memory address in the N memory addresses is accessed by the second data node. In other words, compared with the prior art, the first directory entry created in the foregoing solution includes the first indication information, and the first indication information occupies several bits (for example, N bits). A directory entry created in the prior art may be used only to record a case in which data in a memory address is accessed by the second data node, while the first directory entry created in the foregoing solution may be used to record a case in which data in N memory addresses is accessed by the second data node. Therefore, in the foregoing solution, a cache capacity occupied by the directory can be reduced, and a resource waste can be reduced.

Particularly, when the second data node continuously accesses data in a plurality of memory addresses on the first data node, the data in the plurality of memory addresses is accessed by a same data node, and access requests have a same type. Therefore, a case in which every N memory addresses in the plurality of memory addresses are accessed by the second data node may be recorded in a directory entry, to reduce a cache occupied by the directory to a greater extent.

The first status information is used to indicate a type of the first request, and the type of the first request is an exclusive request or a share request.

In the foregoing solution, after the first directory entry is created, when receiving another request for reading data, the first data node may determine whether to reuse the first directory entry to record a case in which related data is read, or create a new directory entry to record a case in which related data is read. Four scenarios are listed below.

Scenario 1

In one embodiment, after the first data node creates the first directory entry of the directory based on the first request: the first data node receives a second request sent by the second data node, where a type of the second request is the same as the type of the first request, the second request is used to indicate that the second data node requests to read second data in a second physical address, the second physical address includes the tag information, the index information, and second associated address information, and the second associated address information is used to indicate that the second physical address corresponds to a second memory address in the N memory addresses; the first data node searches for a matched directory entry in the directory based on the second request, to find the first directory entry; and then, the first data node sets, based on the second request, a second indication bit corresponding to the second memory address in the first indication information to valid, so as to record a case in which the second data node reads the second data in the first directory entry.

A specific manner in which the first data node searches for a matched directory entry in the directory based on the second request, to find the first directory entry may be as follows: the first data node obtains the first directory entry by indexing based on the tag information and the index information; the first data node determines that a data node indicated by the first pointer information in the first directory entry is the second data node that sends the second request, and determines that the type of the first request indicated by the first status information in the first directory entry is the same as the type of the second request; and the first data node determines the first directory entry as the matched directory entry.

In the scenario 1, the second data node sends the second request to the first data node, to request to read data in the second memory address in the N memory addresses, and the type of the second request is the same as that of the first request. With reference to the foregoing description of a structure of the first directory entry, it can be learned that, in the scenario 1, a type of a read request (namely, the second request) and that the data in the second memory address is read by the second data node can be indicated only by setting an indication bit corresponding to the second memory address in the first indication information of the first directory entry to valid. In this manner, a data reading status that needs to be recorded by creating a new directory entry in the prior art is indicated by modifying the second indication bit in the first directory entry, to reduce the cache occupied by the directory, and avoid the resource waste. Especially, when the second data node continuously accesses the data in the plurality of memory addresses of the first data node, in this manner, a case in which data in every N memory addresses in the plurality of memory addresses are accessed by the second data node may be recorded in a directory entry, to reduce the cache occupied by the directory to a greater extent.

Scenario 2

In one embodiment, after the first data node creates the first directory entry of the directory based on the first request: the first data node may receive a third request sent by the second data node, where a type of the third request is different from the type of the first request, the third request is used to indicate that the second data node requests to read third data in a third physical address, the third physical address includes the tag information, the index information, and third associated address information, and the third associated address information is used to indicate that the third physical address corresponds to a third memory address in the N memory addresses; the first data node searches for a matched directory entry in the directory based on the third request; and then, the first data node creates, when no matched directory entry is found, a second directory entry of the directory based on the third request, where the second directory entry includes the tag information, second indication information, second pointer information, and second status information, the second indication information includes N indication bits that are in one-to-one correspondence with the N memory addresses, a third indication bit corresponding to the third memory address in the N indication bits is set to valid, the other indication bits other than the third indication bit are set to invalid, the second pointer information is used to indicate that data in the memory address corresponding to the indication bit that is set to valid in the second indication information is read by the second data node, and the second status information is used to indicate the type of the third request.

A specific manner in which the first data node searches for a matched directory entry in the directory based on the third request may be as follows: the first data node searches for the first directory entry based on the tag information and the index information; the first data node determines that the data node indicated by the first pointer information in the first directory entry is the second data node that sends the third request, and determines that the type of the first request indicated by the first status information in the first directory entry is different from the type of the third request; and the first data node determines that no matched directory entry is found.

In the scenario 2, the second data node sends the third request to the first data node, to read the data in the third memory address in the N memory addresses, and the type of the third request is different from that of the first request. With reference to the foregoing structure of the first directory entry, it can be learned that, because the first status information in the first directory entry indicates the type of the first request, if the type of the third request is different from that of the first request, the first directory entry cannot be reused to record a data reading status indicated by the third request.

For the second directory entry created in the scenario 2, after creating the second directory entry, if the first data node receives a read request that is sent by the second data node and whose type is the same as the type of the third request, to read data in any one of the N memory addresses, the second directory entry may be reused. In other words, although the created second directory entry occupies a cache of the first data node, the created second directory entry may still be reused when the first data node receives another request. In this way, the cache occupied by the directory may be reduced.

Scenario 3

In one embodiment, after the first data node creates the first directory entry of the directory based on the first request: the first data node may receive a fourth request sent by a third data node, where the fourth request is used to indicate that the third data node requests to read fourth data in a fourth physical address, the fourth physical address includes the tag information, the index information, and fourth associated address information, and the fourth associated address information is used to indicate that the fourth physical address corresponds to a fourth memory address in the N memory addresses; the first data node searches for a matched directory entry in the directory based on the fourth request; and then, the first data node creates, when no matched directory entry is found, a third directory entry of the directory based on the fourth request, where the third directory entry includes the tag information, third indication information, third pointer information, and third status information, the third indication information includes N indication bits that are in one-to-one correspondence with the N memory addresses, a fourth indication bit corresponding to the fourth memory address in the N indication bits is set to valid, the other indication bits other than the fourth indication bit are set to invalid, the third pointer information is used to indicate that data stored in the memory address corresponding to the indication bit that is set to valid in the third indication information is read by the third data node, and the third status information is used to indicate a type of the fourth request.

A specific implementation in which the first data node searches for a matched directory entry in the directory based on the fourth request may be as follows: the first data node searches for the first directory entry based on the tag information and the index information; then, the first data node determines that the data node indicated by the first pointer information in the first directory entry is not the third data node that sends the fourth request; and the first data node determines that no matched directory entry is found.

In the scenario 3, the third data node sends the fourth request to the first data node, to read the data in the fourth memory address in the N memory addresses. With reference to the foregoing structure of the first directory entry, it can be learned that, because the first pointer information in the first directory entry indicates the second data node, and the third data node that sends the fourth request is different from the data node indicated by the first pointer information, the first directory entry cannot be reused to record a data reading status indicated by the fourth request.

For the third directory entry created in the scenario 3, after creating the third directory entry, if the first data node receives a read request that is sent by the third data node and whose type is the same as the type of the fourth request, to read data in any one of the N memory addresses, the third directory entry may be reused. In other words, although the created third directory entry occupies a cache of the first data node, the created third directory entry may still be reused when the first data node receives another request. In this way, the cache occupied by the directory may be reduced.

Scenario 4

In one embodiment, after the first data node creates the first directory entry of the directory based on the first request: the first data node may receive a fifth request sent by a fourth data node, where the fifth request is used to indicate that the fourth data node requests to read the first data; the first data node searches for a matched directory entry in the directory based on the fifth request, to find the first directory entry; and then, after determining, based on the first directory entry, that the first data is read by the second data node, the first data node may notify the fourth data node to initiate listening to the second data node, to read the first data.

In the scenario 4, after receiving the fifth request, the first data node may determine, based on the first directory entry obtained by searching the directory, that the first data that the fourth data node requests to read is read by the second data node. Therefore, to read a latest version of the first data, the fourth data node needs to initiate listening to the second data node, to obtain the first data. In this manner, the first data node obtains related information by searching for a matched directory entry, so that the fourth data node can obtain the first data.

In addition, after the first data node notifies the fourth data node to initiate listening to the second data node and the fourth data reads the first data, the first data node further needs to record a case in which the first data is read, and based on different types of the first request and the fifth request, a manner of recording, by the first data node, the case in which the first data is read may be:

Manner 1

If a type of the fifth request is an exclusive request, the first data node sets the first indication bit in the first indication information to invalid based on the fifth request, and creates a fourth directory entry of the directory. The fourth directory entry includes the tag information, fourth indication information, fourth pointer information, and fourth status information. The fourth indication information includes N indication bits that are in one-to-one correspondence with the N memory addresses, a first indication bit corresponding to the first memory address in the N indication bits is set to valid, and the other indication bits other than the first indication bit are set to invalid. The fourth pointer information is used to indicate that data in the memory address corresponding to the indication bit that is set to valid in the fourth indication information is read by the fourth data node. The fourth status information is used to indicate the type of the fifth request.

In other words, if the fifth request is an exclusive request, the fourth data node exclusively occupies the first data. In this case, the first indication bit in the first indication information is set to invalid, which indicates that the second data node no longer stores the latest version of the first data in this case. However, the fourth directory entry created by the first data node may be used to indicate that the fourth data node exclusively occupies the first data in this case.

Manner 2

If a type of the fifth request is a share request and the type of the first request is a share request, the first data node creates a fifth directory entry of the directory based on the fifth request. The fifth directory entry includes the tag information, fifth indication information, fifth pointer information, and fifth status information. The fifth indication information includes N indication bits that are in one-to-one correspondence with the N memory addresses, a first indication bit corresponding to the first memory address in the N indication bits is set to valid, and the other indication bits other than the first indication bit are set to invalid. The fifth pointer information is used to indicate that data in the memory address corresponding to the indication bit that is set to valid in the fifth indication information is read by the fourth data node. The fifth status information is used to indicate the type of the fifth request.

In other words, if both the fifth request and the first request are share requests, both the fourth data node and the second data node share the first data. Because a case in which the second data node shares the first data has been recorded in the first directory entry, a case in which the fourth data node shares the first data may be recorded by creating the fifth directory entry.

Manner 3

If a type of the fifth request is a share request and the type of the first request is an exclusive request, the first data node sets the first indication bit in the first indication information to invalid based on the fifth request, and creates a sixth directory entry and a seventh directory entry of the directory based on the fifth request. The sixth directory entry includes the tag information, sixth indication information, sixth pointer information, and sixth status information. The sixth indication information includes N indication bits that are in one-to-one correspondence with the N memory addresses, a first indication bit corresponding to the first memory address in the N indication bits is set to valid, and the other indication bits other than the first indication bit are set to invalid. The sixth pointer information is used to indicate that data stored in the memory address corresponding to the indication bit that is set to valid in the sixth indication information is read by the fourth data node. The sixth status information is used to indicate the type of the fifth request. In addition, the seventh directory entry includes the tag information, seventh indication information, seventh pointer information, and seventh status information. The seventh indication information includes N indication bits in one-to-one correspondence with the N memory addresses, a first indication bit in the N indication bits is set to valid, and the other indication bits other than the first indication bit is set to invalid. The seventh pointer information is used to indicate that data stored in the memory address corresponding to the indication bit that is set to valid in the seventh indication information is read by the second data node. The seventh status information is used to indicate the type of the fifth request.

In other words, if the fifth request is a share request and the first request is an exclusive request, after the fourth data node sends the fifth request and obtains a response, both the fourth data node and the second data node share the first data. A case in which the second data node exclusively occupies the first data and that is recorded in the first directory entry is invalid. Therefore, the first indication bit in the first indication information may be set to invalid. In addition, the sixth directory entry and the seventh directory entry are created to respectively indicate a case in which the fourth data node and the second data node share the first data.

It should be noted that in actual implementation, only one of the foregoing four scenarios may occur, or a plurality of scenarios of the foregoing four scenarios may occur. This is not limited in this embodiment of this application.

According to a second aspect, this application provides a directory processing apparatus. The apparatus has a function of implementing the method example in the first aspect. The function may be implemented by hardware, or may be implemented by hardware by executing corresponding software. The hardware or the software includes one or more modules corresponding to the function.

In one embodiment, a structure of the directory processing apparatus includes a transceiver unit and a processing unit. The units may execute corresponding functions in the method example. For details, refer to the detailed descriptions in the method example. Details are not described herein again.

According to a third aspect, an embodiment of this application further provides a directory processing apparatus. The apparatus includes a memory, a processor, and a communications module. The memory is configured to store a computer readable program. The processor is configured to invoke an instruction stored in the memory, to perform a corresponding function in the foregoing method example. The communications module is configured to perform a data receiving function and/or a data sending function in the foregoing method example.

According to a fourth aspect, an embodiment of this application provides a computer-readable storage medium. The computer-readable storage medium stores a computer instruction. When the instruction is run on a computer, the computer is enabled to perform the method in the first aspect and any possible design of the first aspect.

According to a fifth aspect, an embodiment of this application provides a computer program product. When the computer program product is invoked by a computer, the computer is enabled to perform the method in the first aspect and any possible design of the first aspect.

BRIEF DESCRIPTION OF DRAWINGS

FIG. 15 is a schematic diagram of a structure of a second directory entry according to an embodiment of this application;

FIG. 16 is a schematic diagram of a structure of a third directory entry according to an embodiment of this application;

DESCRIPTION OF EMBODIMENTS

To make the objectives, technical solutions, and advantages of embodiments of this application clearer, the following further describes the embodiments of this application in detail with reference to the accompanying drawings.

It should be noted that "a plurality of" means "two or more" in this application. In addition, it should be understood that in the description of this application, terms such as "first" and "second" are merely used for distinction description, and shall not be understood as an indication or implication of relative importance or an indication or implication of an order.

First, an application scenario of the embodiments of this application is briefly described.

Figure 4:
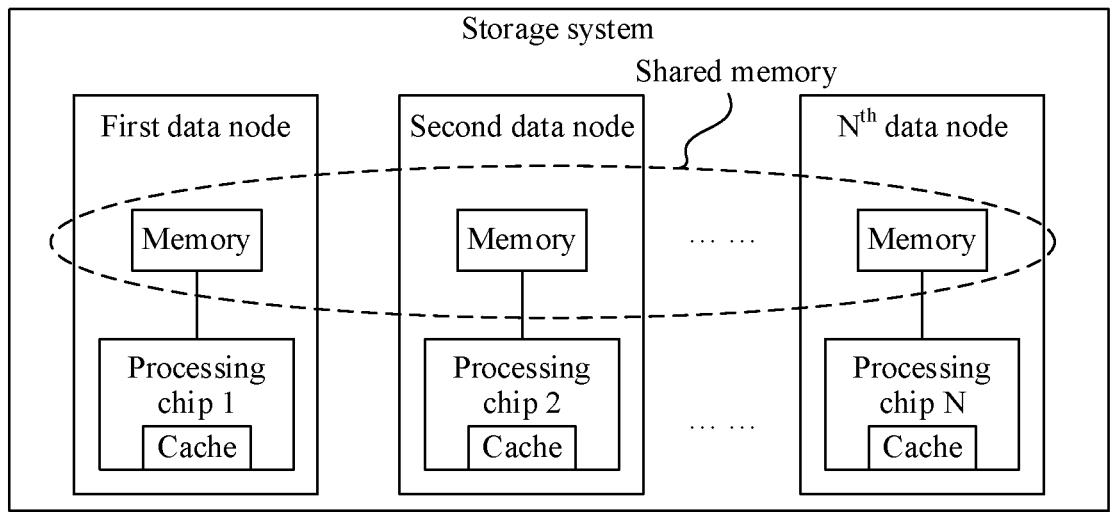
FIG. 4 is a schematic diagram of a structure of a storage system according to an embodiment of this application.

A directory processing solution provided in the embodiments of this application may be applied to a storage system shown in FIG. 4.

The storage system shown in FIG. 4 includes N data nodes: a first data node, a second data node, . . . , an $N^{th}$ data node. Each data node includes a processing chip, a private cache of the data node, and a memory that includes data shared between the data node and another data node.

Figure 1:
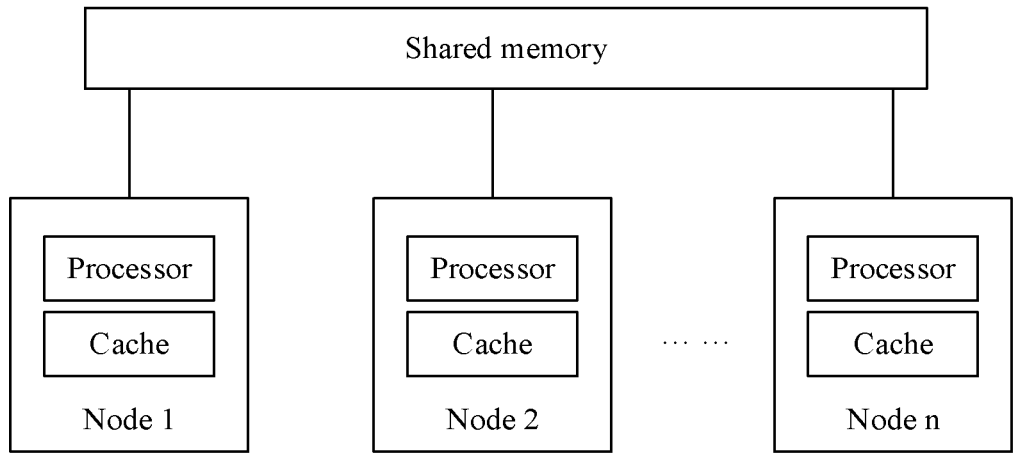
FIG. 1 is a schematic diagram of a structure of a DSM system according to the prior art.
Figure 2:
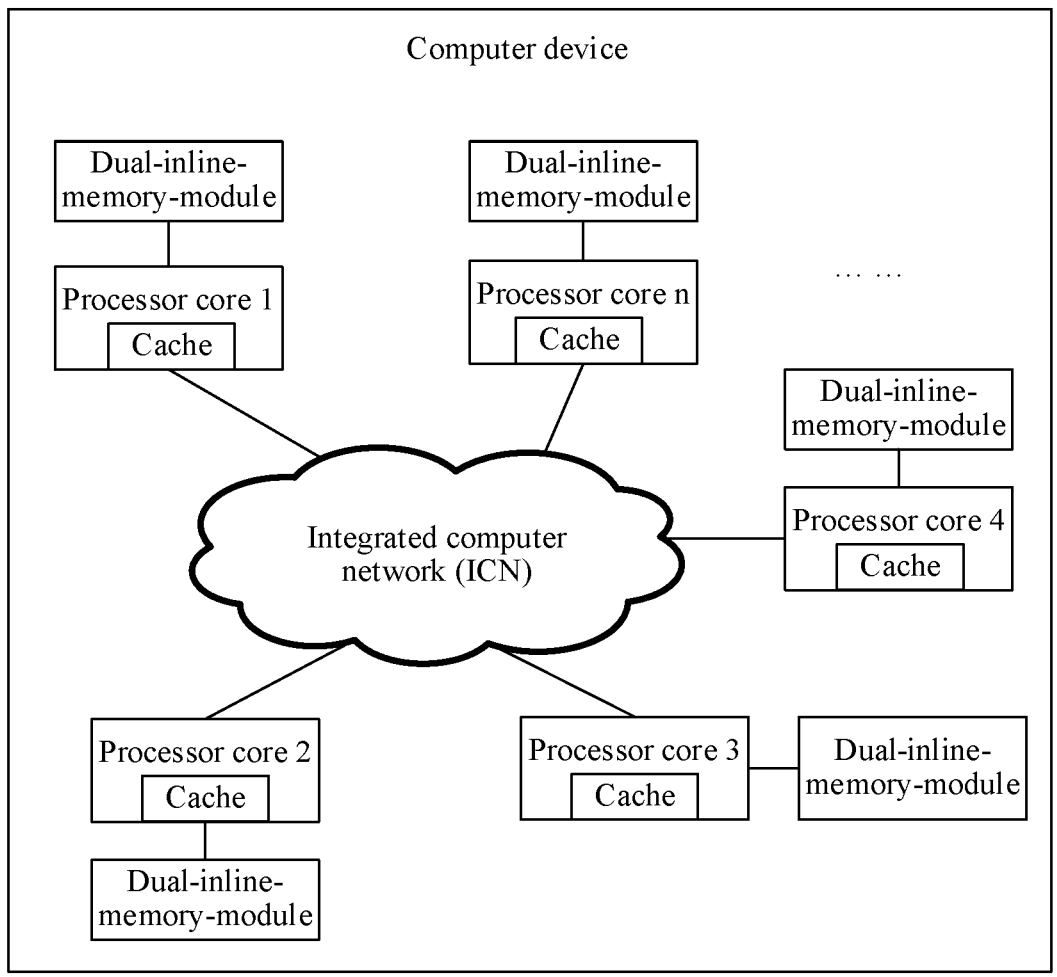
FIG. 2 is a schematic diagram of a structure of a computer device according to the prior art.

In the storage system shown in FIG. 4, the processing chip may be a processor, such as a central processing unit (CPU), a graphics processing unit (GPU), or an artificial intelligence processor (AIP), or may be a processor core. When the processing chip is a processor, the N data nodes may respectively belong to different entity devices, and the storage system shown in FIG. 4 may be considered as a DSM system shown in FIG. 1. When the processing chip is a processor core, the N data nodes may belong to a same entity device, and the storage system shown in FIG. 4 may be considered as a computer device shown in FIG. 2. In this case, memories of the N data nodes may be located on a same storage chip, or may be located on different storage chips.

Based on a memory sharing mechanism, a data node may access a memory of another data node, or may modify data in the memory and save the modified data in a private cache of the data node. For example, the second data node modifies data A in a memory of the first data node, and saves the modified data in a private cache of the second data node. In other words, the data A stored in the memory of the first data node is not a latest version of the data A. In this case, if another data node, for example, a third data node, requests to access the data A, the first data node needs to determine, by searching a directory in a private cache of the first data node, that the latest version of the data A is saved on the second data node, and instruct the third data node to initiate listening to the second data node, to obtain the latest version of the data A. A directory saved in a cache of a data node records a case in which memory data is accessed and modified by another data node.

In the storage system shown in FIG. 4, for a shared memory of the N data nodes, when data is accessed and modified between the data nodes, a directory may be created and modified, so that the data nodes can obtain data of a latest version.

It should be noted that, a data node in the storage system shown in FIG. 4 may further include a private memory (namely, a memory that is not shared with another data node). Because the directory processing solution provided in the embodiments of this application is applied to a memory sharing scenario, the private memory of this part is considered in this application.

Figure 3:
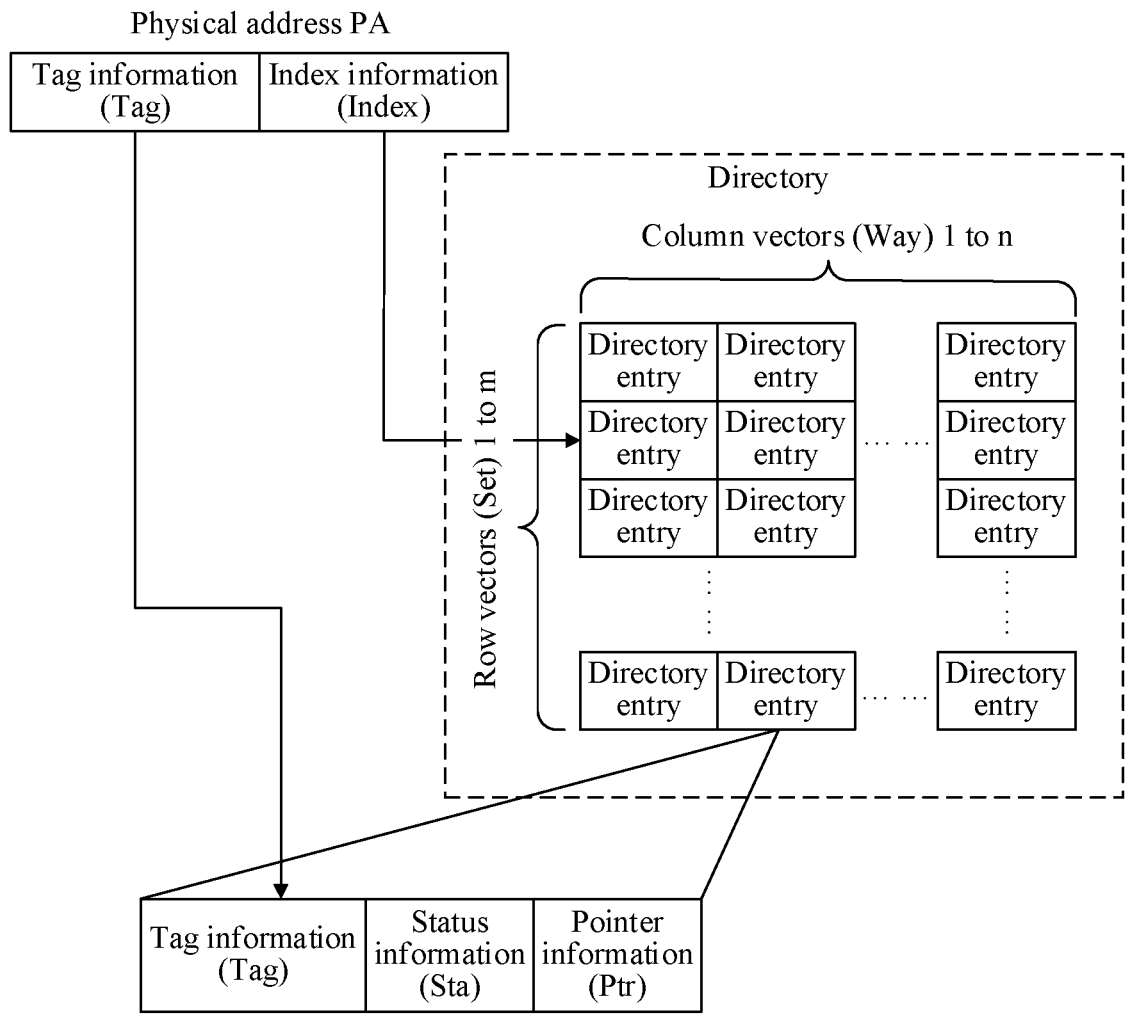
FIG. 3 is a schematic diagram of a directory processing solution according to the prior art.

FIG. 3 shows a directory processing solution in the prior art. A directory includes n×m data blocks, each block represents a directory entry, and each directory entry includes tag information (Tag), status information (Sta), and pointer information (Ptr). Tag is used to match a directory entry, Sta indicates a status (for example, a shared state or an exclusive state) of data corresponding to the directory entry, and Ptr indicates a data node that accesses the data corresponding to the directory entry. When a data node receives a request for reading data in a PA, the data node first searches the directory based on an index in the PA, to determine a set that matches the index in m sets; then the data node determines, based on a tag in the PA, a directory entry that matches the tag in the set, to determine a directory entry that matches the request; and then, a data node that accesses the data and a status of the data may be determined by using Sta and Ptr in the matched directory entry. For example, when Sta is E (namely, exclusive) and Ptr is P1, it indicates that the data is exclusively occupied by the processor core 1 (P1). To make content of a directory entry clearer, the content of the directory entry may also be represented by using E@P1.

In the directory processing solution in the prior art, as long as data in a memory address in a memory of a data node is accessed by another data node, the data node needs to create a directory entry for the memory address. For example, a memory of a data node includes six memory addresses: a memory address 0, a memory address 1, a memory address 2, a memory address 3, a memory address 4, and a memory address 5. The memory address 0, the memory address 4, and the memory address 5 are accessed by another data node. In this case, the data node needs to create three directory entries for the memory address 0, the memory address 4, and the memory address 5 respectively. In the foregoing solution in the prior art, a directory occupies a relatively large quantity of caches, thereby causing a resource waste.

For example, for a storage system that includes 128 data nodes, it is assumed that a physical address in the system includes 40 bits (Bit), lower-order 11 bits of the physical address are considered as a set, and higher-order 29 bits of the physical address are considered as a tag. When searching a directory, a data node first searches for, based on an 11-bit index, a set that matches the index, and then searches for a matched directory entry based on a 29-bit tag. For a found matched directory entry, to distinguish the 128 data nodes, a pointer Ptr of the found matched directory entry occupies at least 7 bits; and to distinguish between an exclusive state, a single-shared state and a multi-shared state of data, a status Sta of the found matched directory entry occupies 2 bits. In addition, the tag may occupy 29 bits. Therefore, the directory entry occupies at least 38 bits (7 Bits+2 Bits+29 Bits=38 Bits). In other words, for a memory address, a capacity of 38 bits is required to record a directory entry of the memory address.

Because there are many memory addresses, a directory entry related to one memory address occupies a cache capacity of 38 bits, which undoubtedly results in that a directory occupies a relatively large cache capacity. From another perspective, due to continuity of memory addresses occupied by data, directory entries corresponding to most consecutive memory addresses have same content, but content of a same directory entry needs to be recorded by occupying a plurality of directory entries, which inevitably results in that the directory occupies a relatively large cache capacity. When the directory occupies a relatively large cache capacity, not only a resource waste is caused, but also a processing speed of the data node is affected.

Therefore, embodiments of this application provide a directory processing method and apparatus, and a storage system, to resolve a problem of a resource waste caused because a directory occupies a relatively large quantity of caches in the foregoing directory processing solution. The method and the apparatus are based on a same inventive concept. Because principles of the method and the apparatus for resolving a problem are similar, mutual reference may be made between implementations of the apparatus and the method, and repeated descriptions are omitted.

To make objectives, technical solutions, and advantages of this application clearer, the following further describes this application in detail with reference to the accompanying drawings.

Figure 5:
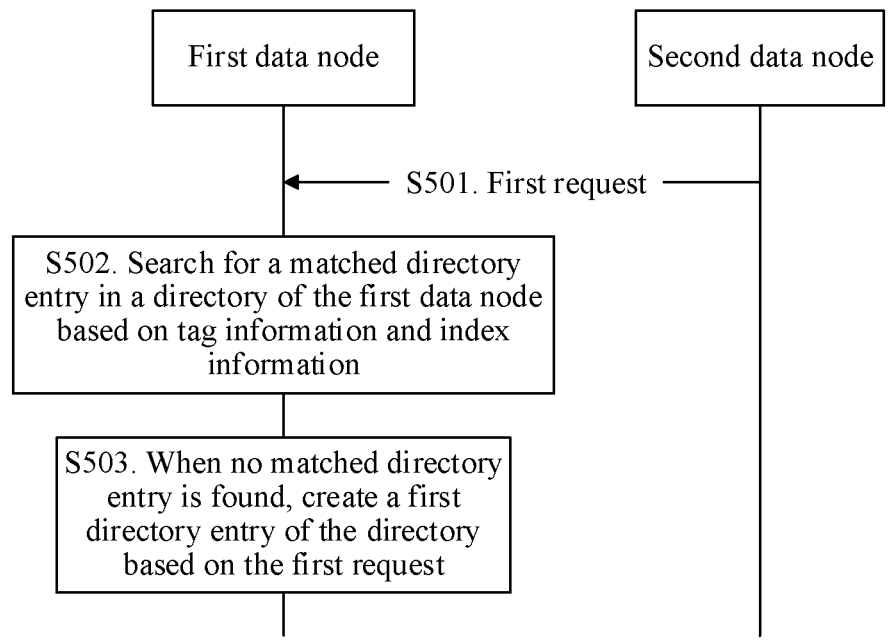
FIG. 5 is a schematic flowchart of a directory processing method according to an embodiment of this application.

Referring to FIG. 5, FIG. 5 is a schematic flowchart of a directory processing method according to an embodiment of this application. The method includes the following operations.

S501. A first data node receives a first request sent by a second data node.

In S501, the first request is used to indicate that the second data node requests to read first data in a first physical address, the first physical address includes tag information, index information, and first associated address information, the first associated address information is used to indicate that the first physical address corresponds to a first memory address in N memory addresses of a memory of the first data node, and N is greater than 1.

The first physical address and the first memory address may be understood as follows: the first physical address is a real address for storing the first data in the memory, and is an absolute address; and the first memory address is a logical address that can be identified by a program. An address carried in a memory access instruction (namely, the first request) is a logical address. Only after a memory management unit in an operating system of the first data node maps the logical address to the first physical address, the first data can be accessed by using the first physical address. Because the foregoing mapping relationship exists between the first physical address and the first memory address, "the first physical address corresponds to the first memory address" is mentioned in this embodiment of this application. In addition, translation between a logical address and a physical address belongs to the prior art, and details are not described herein.

In this embodiment of this application, the first physical address may be divided into three parts: the tag information, the index information, and the first associated address information. The first associated address information is used to indicate that the first physical address corresponds to the first memory address in the N memory addresses of the memory of the first data node. In other words, the second data node requests to read data in the first memory address.

Figures 6, 7, 8:
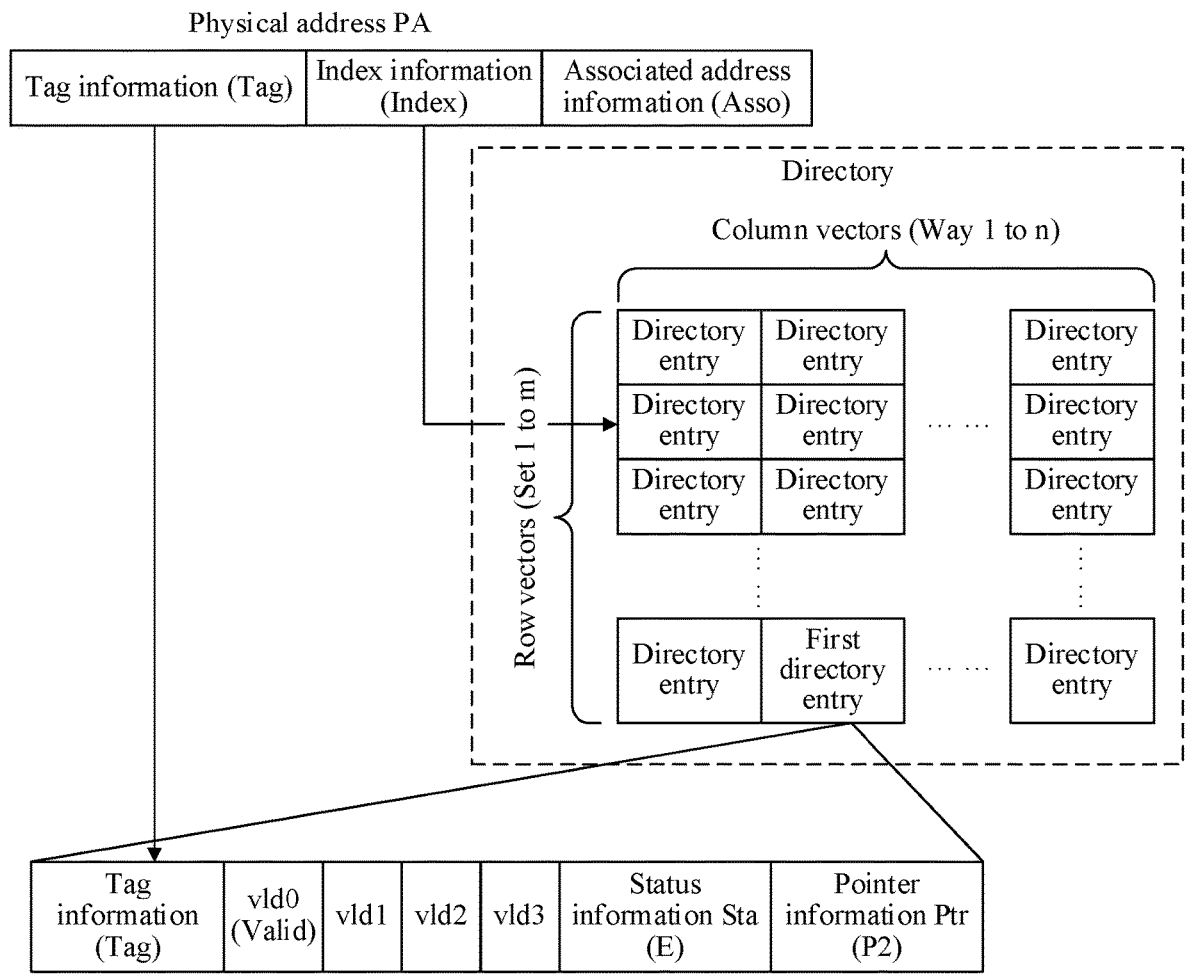
FIG. 6 is a schematic diagram of a structure of a first physical address according to an embodiment of this application.
FIG. 7 is a schematic diagram of a structure of a first directory entry according to an embodiment of this application.
FIG. 8 is a schematic diagram of indexing a first directory entry based on tag information and index information according to an embodiment of this application.

For example, FIG. 6 shows a schematic diagram of a structure of the first physical address. In FIG. 6, tag indicates the tag information, "index" indicates the index information, and "Asso" indicates the first associated address information.

In addition, a quantity of bits occupied by the first associated address information in the first physical address is related to N. Because the first associated address information needs to indicate the first memory address in the N memory addresses, the quantity of bits occupied by the first associated address information needs to be capable of distinguishing the N memory addresses. For example, when N is 4, the quantity of bits occupied by the first associated address information is at least 2; and when N is 9, the quantity of bits occupied by the first associated address information is at least 3.

In an example of N=4, it is assumed that the N memory addresses are A0 to A3. In this case, the quantity of bits occupied by the first associated address information is 2. In this case, when the first associated address information is 00, the first associated address information may correspond to A0 in the N memory addresses; when the first associated address information is 01, the first associated address information may correspond to A1 in the N memory addresses; when the first associated address information is 10, the first associated address information may correspond to A2 in the N memory addresses; and when the first associated address information is 11, the first associated address information may correspond to A3 in the N memory addresses.

It should be noted that a value of N may satisfy a form of $2^m$ (m is a positive integer), for example, N may be 4, 8, or 16. Alternatively, the value of N may not satisfy the form of $2^m$, for example, N may be 5, 9, or 11. This is not specifically limited in this embodiment of this application, provided that the quantity of bits occupied by the first associated address information is capable of distinguishing the N memory addresses.

It should also be noted that, in S501, the N memory addresses may be consecutive memory addresses or inconsecutive memory addresses. This is not specifically limited in this embodiment of this application.

S502. The first data node searches for a matched directory entry in a directory of the first data node based on the index information and the tag information.

The directory of the first data node may include a plurality of ways and a plurality of sets. When searching for a matched directory entry in the directory based on the index information and the tag information, the first data node first searches for, based on the index information, a set that matches the index information in the plurality of sets. If no set that matches the index information is found, it indicates that none of the N memory addresses is accessed by another data node. If a set that matches the index information is found, the first data node searches for, based on the tag information, a way that matches the tag information in the set. If a way that matches the tag information is found, a found directory entry includes a case in which any one or more of the N memory addresses are accessed by another data node. If no way that matches the tag information is found, it indicates that none of the N memory addresses is accessed by another data node.

With reference to the foregoing description, it can be learned that in S502, the directory of the first data node is searched based on the index information and the tag information. If no matched directory entry is found, it may indicate that, for any one of the N memory addresses, the directory of the first data node does not record a directory entry related to the memory address. In other words, none of the N memory addresses is accessed by another data node.

Specifically, if no matched directory entry is found by the first data node based on the first request, there may be two specific implementations: 1. The directory of the first data node is searched based on the index information, and no set that matches the index information is found. 2. The directory of the first data node is searched based on the index information, and a set that matches the index information is found. Then, the matched set is searched based on the tag information, and no way that matches the tag information is found.

S503. The first data node creates, when no matched directory entry is found, a first directory entry of the directory based on the first request.

The first directory entry includes the tag information, first indication information, first pointer information, and first status information. The first indication information includes N indication bits that are in one-to-one correspondence with the N memory addresses, a first indication bit corresponding to the first memory address in the N indication bits is set to valid, and the other indication bits other than the first indication bit are set to invalid. The first pointer information is used to indicate that data in the memory address corresponding to the indication bit that is set to valid in the first indication information is read by the second data node.

Different information included in the first directory entry is explained one by one below.

1. Tag Information

A meaning of the tag information in the first directory entry is the same as that of the tag information in the first physical address, to be specific, the tag information is used to determine, based on the tag information, a directory entry that matches the tag information. For example, the tag information may include 27 bits.

2. First Pointer Information

The first pointer information in the first directory entry is used to indicate that the data in the memory address corresponding to the indication bit that is set to valid in the first indication information is read by the second data node. In other words, the first pointer information needs to indicate a data node that is in N data nodes and that accesses the data in the memory address corresponding to the indication bit that is set to valid in the first indication information. In this case, a quantity of bits occupied by the first pointer information needs to be capable of distinguishing the N data nodes.

For example, if the storage system includes 64 data nodes, to distinguish between the 64 data nodes, the first pointer information occupies at least 6 bits, 000000 represents a first data node in the 64 data nodes, 000001 represents a second data node in the 64 data nodes, and so on. If the storage system includes 128 data nodes, to distinguish between the 128 data nodes, the first pointer information occupies at least 7 bits, 0000000 represents a first data node in the 128 data nodes, 0000001 represents a second data node in the 128 data nodes, and so on.

It should be noted that, although the first pointer information in this embodiment of this application and pointer information (Ptr) in the prior art have a same representation form, specific meanings of the first pointer information and the pointer information (Ptr) are slightly different. In the prior art, data in a memory address corresponding to a directory entry is accessed by a data node indicated by the pointer information (Ptr). However, in this embodiment of this application, because a directory entry records a case in which data in N memory addresses is accessed by the second data node, a data node indicated by the first pointer information does not necessarily access all data in the N memory addresses, that the data node indicated by the first pointer information specifically accesses the data in which one or more of the N memory addresses needs to be determined based on a case in which the N indication bits included in the first indication information are valid or invalid.

3. First Status Information

In this embodiment of this application, the first status information is used to indicate a type of the first request, and the type of the first request may be an exclusive request or a share request. If the first request is an exclusive request, the first status information is used to indicate that the data in the memory address corresponding to the indication bit that is set to valid in the first indication information is in an exclusive state; or, if the first request is a share request, the first status information is used to indicate that the data in the memory address corresponding to the indication bit that is set to valid in the first indication information is in a shared state.

For the exclusive state and the shared state of the data, as the names imply, the exclusive state indicates that the data in the memory address corresponding to the indication bit that is set to valid in the first indication information is exclusively occupied by a data node, and the shared state indicates that the data in the memory address corresponding to the indication bit that is set to valid in the first indication information is shared by at least one data node. Specifically, the shared state may be further divided into a single-shared state and a multi-shared state. The single-shared state indicates that the data is shared by one data node; and the multi-shared state indicates that the data is shared by a plurality of data nodes.

To more clearly express a status (namely, the first status information) of the data in the memory address corresponding to the indication bit that is set to valid in the first indication information, different meanings of the first status information are explained below in Table 1.

TABLE 1

| Code of the first status information | Status | Definition |
|---|---|---|
| 11 | Exclusive state | Data is exclusively occupied by a data node |
| 10 | Single-shared state | Data is shared by one data node |
| 01 | Multi-shared state | Data is shared by a plurality of data nodes |

It should be noted that, in Table 1, different codes of the first status information are merely an example. During actual implementation, codes of different states are not limited to forms in Table 1.

4. First Indication Information

The created first directory entry in this embodiment of this application not only includes the tag information, the first pointer information, and the first status information, but also includes the first indication information. The first indication information includes the N indication bits, the first indication bit corresponding to the first memory address in the N indication bits is set to valid, and the other indication bits other than the first indication bit is set to invalid. Because the first pointer information is used to indicate that the data in the memory address corresponding to the indication bit that is set to valid in the first indication information is read by the second data node, the indication bit in the first indication information is set to valid or invalid in the foregoing manner, which means that the data (namely, the first data) in the first memory address corresponding to the first indication bit that is set to valid in the first indication information is read by the second data node, and data in the memory addresses corresponding to the indication bits that are set to invalid in the first indication information are not read by the second data node.

For example, it is assumed that the first indication information includes four indication bits (to be specific, N=4) that are respectively vld0, vld1, vld2, and vld3, and memory addresses respectively corresponding to the four indication bits are A0, A1, A2, and A3. If the vld0 is set to valid, it indicates that data in the A0 is read by the second data node, and data in the A1, the A2, and the A3 are not read by the second data node; if the vld2 is set to valid, it indicates that data in the A2 is read by the second data node, and data in the A0, the A1, and the A3 are not read by the second data node; or, if vld0 and vld1 are set to valid, it indicates that data in the A0 and the A1 are read by the second data node, and data in the A2 and the A3 are not read by the second data node.

It can be easily learned that the first indication information included in the first directory entry may be used to indicate the case in which the data in the N memory addresses is accessed by the second data node. In other words, the first directory entry created in S503 may be used to record the case in which the data in the N memory addresses is accessed by the second data node.

It should be noted that, because the first indication information includes that each of the N indication bits has only a valid state and an invalid state, each indication bit occupies only 1 bit. For example, when an indication bit is 1, it indicates that the indication bit is valid, and when an indication bit is 0, it indicates that the indication bit is invalid. In this case, the first indication information occupies N bits.

Compared with the prior art, although the first directory entry created in this embodiment of this application includes the first indication information, and the first indication information occupies N more bits in the first directory entry, in the prior art, one directory entry is used only to record a case in which data in one memory address is accessed by another data node (for example, the second data node), but the created first directory entry in this embodiment of this application may be used to record the case in which the data in the N memory addresses is accessed by the second data node.

The following describes, by using a specific example, why the created directory entry in this embodiment of this application can reduce a cache occupied by the directory. Assuming that the storage system includes 128 data nodes, to distinguish between the 128 data nodes, the pointer information occupies at least 7 bits in the created directory entry; and to distinguish between different data statuses (for example, the exclusive state, the single-shared state, and the multi-shared state), the status information occupies at least 2 bits. It is assumed that the tag information occupies 27 bits. In this case, by using the solution in the prior art, a directory entry that records a case in which a memory address is accessed by another data node occupies at least 36 bits. However, by using the solution provided in this embodiment of this application, assuming that N=4, a directory entry that records a case in which four memory addresses are accessed by another data node occupies at least 40 bits. If data of 11000×16 memory addresses need to be recorded in the directory of the first data node (to be specific, the directory includes 11000 sets, and each set includes 16 ways), by using the solution in the prior art, a cache capacity occupied by the directory of the first data node is 11000×16×36 Bits 0.755 MB. By using the solution provided in this embodiment of this application, in an ideal situation (to be specific, in a case in which directory information of every N memory addresses may be recorded in one directory entry), the cache capacity occupied by the directory of the first data node is 11000×16×40 Bits/4≈0.21 MB.

It can be learned from the foregoing example that, by using the solution provided in this embodiment of this application, the cache occupied by the directory can be reduced. Especially, when a data node (for example, the second data node) continuously accesses data in a plurality of memory addresses of the first data node, because the data in the plurality of memory addresses is accessed by a same data node, and access requests have a same type, a case in which every N memory addresses in the plurality of memory addresses are accessed by the data node (for example, the second data node) may be recorded in a directory entry, to reduce the cache occupied by the directory to a greater extent.

With reference to the foregoing descriptions of the tag information, the first indication information, the first pointer information, and the first status information that are included in the first directory entry, a structure of the created first directory entry in this embodiment of this application may be shown in FIG. 7. In FIG. 7, tag indicates the tag information, Sta indicates the first status information, and Ptr indicates the first pointer information. In addition, the first directory entry shown in FIG. 7 further includes the first indication information.

After the first directory entry is created by performing the method shown in FIG. 5, if the first data node receives again a read request for reading data in another memory address in the N memory addresses, or receives a read request for reading the data (namely, the first data) in the first memory address, the first data node may search for the first directory entry in the directory based on the index information and the tag information. Then, the first data node may determine, based on a type of the request and a data node that sends the request, whether the first directory entry can be reused, to record a case in which the data node that sends the request accesses corresponding data.

For example, when the first request received by the first data node is an exclusive request, a process in which the first data node searches for the first directory entry based on the index information and the tag information may be shown in FIG. 8. In FIG. 8, a physical address PA includes tag information tag, index information "Index", and associated address information "Asso". The first data node searches for the directory of the first data node based on the index information and the tag information, and may find the first directory entry. If N=4, a structure of the indexed first directory entry may be shown in FIG. 8. Tag indicates the tag information, vld0, vld1, vld2, and vld3 indicate four indication bits included in the first indication information, Sta indicates the first status information, and Ptr indicates the first pointer information. The vld0 is set to valid, which indicates that the data (namely, the first data) in the first memory address in four memory addresses is read by the second data node. The first status information indicated by the Sta is represented by E, indicating that the first request is an exclusive request, to be specific, indicating that the second data node exclusively occupies the data (namely, the first data) in the first memory address. The first pointer information indicated by the Ptr is represented by P2 (namely, the second data node), indicating that the data (namely, the first data) in the first memory address is read by the second data node.

Specifically, if a read request sent by another data node is received, after finding the first directory entry based on index information and tag information of the request, the first data node performs, based on a different type of the request and a different sender, operations that may include the following cases.

Case 1

After performing S503 of creating the first directory entry of the directory based on the first request, the first data node receives a second request sent by the second data node. A type of the second request is the same as the type of the first request. The second request is used to indicate that the second data node requests to read second data in a second physical address. The second physical address includes the tag information, the index information, and second associated address information. The second associated address information is used to indicate that the second physical address corresponds to a second memory address in the N memory addresses. Then, the first data node searches for a matched directory entry in the directory based on the second request, to find the first directory entry. The first data node sets, based on the second request, a second indication bit corresponding to the second memory address in the first indication information to valid.

That the first data node searches for a matched directory entry in the directory based on the second request, to find the first directory entry may be specifically determined in the following manner: The first data node searches for the first directory entry based on the tag information and the index information; the first data node determines that a data node indicated by the first pointer information in the first directory entry is the second data node that sends the second request, and determines that the type of the first request indicated by the first status information in the first directory entry is the same as the type of the second request; and the first data node determines the first directory entry as the matched directory entry.

In other words, after the first data node finds the first directory entry based on the tag information and the index information, whether the first directory entry can be reused to record a data reading status indicated by the second request is determined by further determining a sender of the second request and the type of the second request. When the sender of the second request is consistent with the data node (the second data node) indicated by the first pointer information, and the type of the second request is consistent with the type (namely, the type of the first request) indicated by the first status information, the first directory entry may be reused, to be specific, the data reading status indicated by the second request is recorded by setting the second indication bit corresponding to the second memory address in the first indication information to valid.

Figures 9, 10, 11, 12:
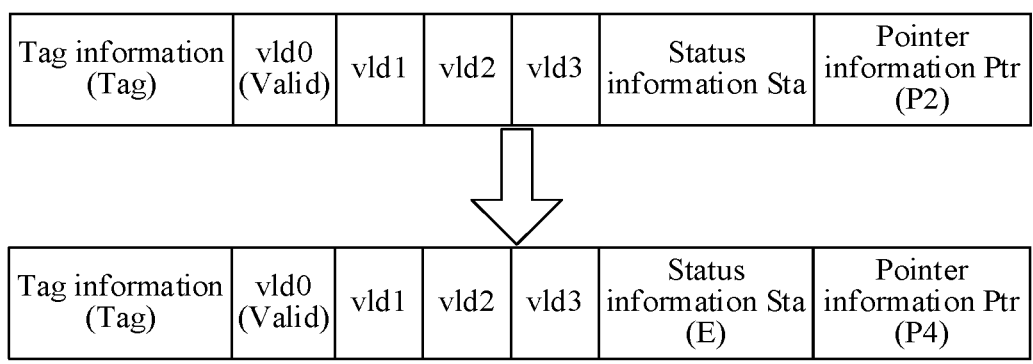
FIG. 9 is a schematic diagram of a structure of a first directory entry according to an embodiment of this application.
FIG. 10 is a schematic diagram of a structure of a second directory entry according to an embodiment of this application.
FIG. 11 is a schematic diagram of a structure of a third directory entry according to an embodiment of this application.
FIG. 12 is a schematic diagram of modifying a first directory entry according to an embodiment of this application.

Specifically, if the structure of the first directory entry created in S503 is the structure of the first directory entry shown in FIG. 8, after the first directory entry is reused in the case 1, the structure of the first directory entry may be shown in FIG. 9. In the first directory entry shown in FIG. 9, both the vld0 corresponding to the first memory address and the vld1 corresponding to the second memory address are set to valid, to indicate that the second data node (P2) has accessed the first data in the first memory address and the second data in the second memory address. In addition, an access type is the type of the first request (namely, the type of the second request).

In the case 1, the second data node sends the second request to the first data node, to request to read the data in the second memory address in the N memory addresses, and the type of the second request is the same as that of the first request. With reference to the foregoing description of the structure of the first directory entry, it can be learned that, in this case, the type of the read request (namely, the second request) and that the data in the second memory address is read by the second data node can be indicated only by setting the indication bit corresponding to the second memory address in the first indication information of the first directory entry to valid. In this manner, a data reading status that needs to be recorded by creating a new directory entry in the prior art is indicated by modifying the second indication bit in the first directory entry, to reduce a cache occupied by the directory, and avoid a resource waste. Especially, when the second data node continuously accesses data in the plurality of memory addresses of the first data node, in this manner, a case in which data in every N memory addresses in the plurality of memory addresses are accessed by the second data node may be recorded in a directory entry, to reduce the cache occupied by the directory to a greater extent.

Case 2

After performing S503 of creating the first directory entry of the directory based on the first request, the first data node receives a third request sent by the second data node. A type of the third request is different from the type of the first request. The third request is used to indicate that the second data node requests to read third data in a third physical address. The third physical address includes the tag information, the index information, and third associated address information. The third associated address information is used to indicate that the third physical address corresponds to a third memory address in the N memory addresses. Then, the first data node searches for a matched directory entry in the directory based on the third request, and creates, when no matched directory entry is found, a second directory entry of the directory based on the third request. The second directory entry includes the tag information, second indication information, second pointer information, and second status information. The second indication information includes N indication bits that are in one-to-one correspondence with the N memory addresses, a third indication bit corresponding to the third memory address in the N indication bits is set to valid, and the other indication bits other than the third indication bit are set to invalid. The second pointer information is used to indicate that data in the memory address corresponding to the indication bit that is set to valid in the second indication information is read by the second data node. The second status information is used to indicate the type of the third request.

That the first data node searches for a matched directory entry in the directory may be specifically determined in the following manner: The first data node searches for the first directory entry based on the tag information and the index information; the first data node determines that the data node indicated by the first pointer information in the first directory entry is the second data node that sends the third request, and determines that the type of the first request indicated by the first status information in the first directory entry is different from the type of the third request; and the first data node determines that no matched directory entry is found.

In other words, after the first data node finds the first directory entry based on the tag information and the index information, whether the first directory entry can be reused to record a data reading status indicated by the second request is determined by further determining a sender of the second request and the type of the second request. When the sender of the second request is consistent with the data node (the second data node) indicated by the first pointer information, but the type of the second request is consistent with the type (namely, the type of the first request) indicated by the first status information, the first directory entry may not be reused. In this case, a second directory entry needs to be created, to record a case in which the second data node reads the data in the third memory address based on the third request.

Specifically, a structure of the second directory entry created in the case 2 may be shown in FIG. 10. In the second directory entry shown in FIG. 10, the vld2 corresponding to the third memory address is set to valid, to indicate that the second data node (P2) has accessed the third data in the third memory address, and an access type is the type of the third request, for example, may be a shared type (Share) represented by S.

In the case 2, the second data node sends the third request to the first data node, to read the data in the third memory address in the N memory addresses, and the type of the third request is different from that of the first request. With reference to the foregoing structure of the first directory entry, it can be learned that, because the first status information in the first directory entry indicates the type of the first request, if the type of the third request is different from that of the first request, the first directory entry cannot be reused to record a data reading status indicated by the third request.

For the second directory entry created in the case 2, after creating the second directory entry, if the first data node receives a read request that is sent by the second data node and whose type is the same as the type of the third request, to read data in any one of the N memory addresses, the second directory entry may be reused. For a manner of reusing the second directory entry, refer to the manner of reusing the first directory entry described in the case 1. Details are not described herein again. In other words, although the created second directory entry occupies a cache of the first data node, the created second directory entry may still be reused when the first data node receives another request. In this way, the cache occupied by the directory may be reduced.

Case 3

After performing S503 of creating the first directory entry of the directory based on the first request, the first data node receives a fourth request sent by a third data node. The fourth request is used to indicate that the third data node requests to read fourth data in a fourth physical address. The fourth physical address includes the tag information, the index information, and fourth associated address information. The fourth associated address information is used to indicate that the fourth physical address corresponds to a fourth memory address in the N memory addresses. Then, the first data node searches for a matched directory entry in the directory based on the fourth request. The first data node creates, when no matched directory entry is found, a third directory entry of the directory based on the fourth request. The third directory entry includes the tag information, third indication information, third pointer information, and third status information. The third indication information includes N indication bits that are in one-to-one correspondence with the N memory addresses, a fourth indication bit corresponding to the fourth memory address in the N indication bits is set to valid, and the other indication bits other than the fourth indication bit are set to invalid. The third pointer information is used to indicate that data stored in the memory address corresponding to the indication bit that is set to valid in the third indication information is read by the third data node. The third status information is used to indicate a type of the fourth request.

A specific implementation in which the first data node searches for a matched directory entry in the directory based on the fourth request may be as follows: The first data node searches for the first directory entry based on the tag information and the index information; the first data node determines that the data node indicated by the first pointer information in the first directory entry is not the third data node that sends the fourth request; and the first data node determines that no matched directory entry is found.

In other words, after the first data node finds the first directory entry based on the tag information and the index information, whether the first directory entry can be reused to record a data reading status indicated by the second request is determined by further determining a sender of the second request and the type of the second request. When the sender of the second request is not consistent with the data node (the second data node) indicated by the first pointer information, the first directory entry cannot be reused regardless of whether the type of the fourth request is the same as the type (namely, the type of the first request) indicated by the first status information. In this case, a third directory entry needs to be created, to record a case in which the third data node reads the data in the fourth memory address based on the fourth request.

Specifically, a structure of the third directory entry created in the case 3 may be shown in FIG. 11. In the third directory entry shown in FIG. 11, the vld3 corresponding to the fourth memory address is set to valid, to indicate that the third data node (P3) has accessed the third data in the third memory address, and an access type is the type of the third request.

In the case 3, the third data node sends the fourth request to the first data node, to read the data in the fourth memory address in the N memory addresses. With reference to the foregoing structure of the first directory entry, it can be learned that, because the first pointer information in the first directory entry indicates the second data node, and the third data node that sends the fourth request is different from the data node indicated by the first pointer information, the first directory entry cannot be reused to record a data reading status indicated by the fourth request.

For the third directory entry created in the case 3, after creating the third directory entry, if the first data node receives a read request that is sent by the third data node and whose type is the same as the type of the fourth request, to read data in any one of the N memory addresses, the third directory entry may be reused. For a manner of reusing the third directory entry, refer to the manner of reusing the first directory entry described in the case 1. Details are not described herein again. In other words, although the created third directory entry occupies a cache of the first data node, the created third directory entry may still be reused when the first data node receives another request. In this way, the cache occupied by the directory may be reduced.

Case 4

After performing S503 of creating the first directory entry of the directory based on the first request, the first data node receives a fifth request sent by a fourth data node. The fifth request is used to indicate that the fourth data node requests to read the first data. The first data node searches for a matched directory entry in the directory based on the fifth request, to find the first directory entry; and then, after determining, based on the first directory entry, that the first data is read by the second data node, the first data node may notify the fourth data node to initiate listening to the second data node, to read the first data.

In the case 4, after receiving the fifth request, the first data node may determine, based on the first directory entry obtained by searching the directory, that the first data that the fourth data node requests to read is read by the second data node. Therefore, to read a latest version of the first data, the fourth data node needs to initiate listening to the second data node, to obtain the first data. In this manner, the first data node obtains related information by searching for a matched directory entry, so that the fourth data node can obtain the first data.

In addition, after the first data node notifies the fourth data node to initiate listening to the second data node, the fourth data node obtains the first data, to be specific, the latest version of the first data is stored in the fourth data node. In this case, the first data node needs to modify the first directory entry in the directory, or create a directory entry of information, to record a change of access to the first data. Specifically, the first data node may process the directory in the following three manners based on different cases.

Manner 1

If a type of the fifth request is an exclusive request, the first data node sets the first indication bit in the first indication information to invalid based on the fifth request, and creates a fourth directory entry of the directory. The fourth directory entry includes the tag information, fourth indication information, fourth pointer information, and fourth status information. The fourth indication information includes N indication bits that are in one-to-one correspondence with the N memory addresses, a first indication bit corresponding to the first memory address in the N indication bits is set to valid, and the other indication bits other than the first indication bit are set to invalid. The fourth pointer information is used to indicate that data in the memory address corresponding to the indication bit that is set to valid in the fourth indication information is read by the fourth data node. The fourth status information is used to indicate the type of the fifth request.

In other words, if the fifth request is an exclusive request, the fourth data node exclusively occupies the first data. In this case, the first indication bit in the first indication information is set to invalid, which indicates that the second data node no longer stores the latest version of the first data in this case. However, the fourth directory entry created by the first data node may be used to indicate that the fourth data node exclusively occupies the first data in this case.

It should be noted that the first indication information in the first directory entry includes N indication bits. If only the first indication bit in the N indication bits is set to valid before the first indication bit is set to invalid, after the first indication bit is set to invalid, all the N indication bits are invalid. In this case, both the first pointer information and the first status information in the first directory entry are invalid for the N memory addresses, and the first data node may delete the first directory entry. In this case, in the manner 1, one first directory entry needs to be deleted, and then one fourth directory entry is created. Therefore, to reduce overheads and processing load of the first data node, a case in which the fourth data node exclusively occupies the first data may be represented by modifying content of the first directory entry, and the fourth directory entry does not need to be created.

Specifically, a process of modifying the first directory entry may be shown in FIG. 12. In FIG. 12, the first directory entry includes four indication bits. Before the first indication bit is set to invalid, only the first indication bit (namely, the vld0) is set to valid. In this way, after the fourth data node sends the fifth request and obtains a response, the fourth data node exclusively occupies the first data. Therefore, the first data node may modify the first indication information of the first directory entry from the second data node (P2) to the fourth data node (P4), and modify the first status information into an exclusive state (E) (if the first status information is an exclusive state, the first status information does not need to be modified), to indicate a case in which the fourth data node exclusively occupies the first data.

Manner 2

If a type of the fifth request is a share request and the type of the first request is a share request, the first data node creates a fifth directory entry of the directory based on the fifth request. The fifth directory entry includes the tag information, fifth indication information, fifth pointer information, and fifth status information. The fifth indication information includes N indication bits that are in one-to-one correspondence with the N memory addresses, a first indication bit corresponding to the first memory address in the N indication bits is set to valid, and the other indication bits other than the first indication bit are set to invalid. The fifth pointer information is used to indicate that data in the memory address corresponding to the indication bit that is set to valid in the fifth indication information is read by the fourth data node. The fifth status information is used to indicate the type of the fifth request.

In other words, if both the fifth request and the first request are share requests, both the fourth data node and the second data node share the first data. Because a case in which the second data node shares the first data has been recorded in the first directory entry, a case in which the fourth data node shares the first data may be recorded by creating the fifth directory entry.

Manner 3

If a type of the fifth request is a share request and the type of the first request is an exclusive request, the first data node sets the first indication bit in the first indication information to invalid based on the fifth request, and creates a sixth directory entry and a seventh directory entry of the directory based on the fifth request. The sixth directory entry includes the tag information, sixth indication information, sixth pointer information, and sixth status information. The sixth indication information includes N indication bits that are in one-to-one correspondence with the N memory addresses, a first indication bit corresponding to the first memory address in the N indication bits is set to valid, and the other indication bits other than the first indication bit are set to invalid. The sixth pointer information is used to indicate that data stored in the memory address corresponding to the indication bit that is set to valid in the sixth indication information is read by the fourth data node. The sixth status information is used to indicate the type of the fifth request.

The seventh directory entry includes the tag information, seventh indication information, seventh pointer information, and seventh status information. The seventh indication information includes N indication bits in one-to-one correspondence with the N memory addresses, a first indication bit in the N indication bits is set to valid, and the other indication bits other than the first indication bit is set to invalid. The seventh pointer information is used to indicate that data stored in the memory address corresponding to the indication bit that is set to valid in the seventh indication information is read by the second data node. The seventh status information is used to indicate the type of the fifth request.

In other words, if the fifth request is a share request and the first request is an exclusive request, after the fourth data node sends the fifth request and obtains a response, both the fourth data node and the second data node share the first data. A case in which the second data node exclusively occupies the first data and that is recorded in the first directory entry is invalid. Therefore, the first indication bit in the first indication information may be set to invalid. In addition, the sixth directory entry and the seventh directory entry are created to respectively indicate a case in which the fourth data node and the second data node share the first data.

The same as the manner 1, if only the first indication bit in the N indication bits is set to valid before the first indication bit of the first indication information is set to invalid, a case in which the second data node shares the first data may be indicated by modifying the first directory entry, and the seventh directory entry does not need to be created, to reduce overheads and processing load of the first data node. For a detailed processing procedure, refer to related descriptions in the manner 1. Details are not described herein again.

The following provides additional information about the four cases described above.

The four cases listed above are operations performed by the first data node after another data node (other than the first data node) initiates a read request for data in any one of the N memory addresses. If the another data node requests to read data in a memory address other than the N memory addresses, the first directory entry cannot be found based on the request, and the first directory entry may not be modified or reused.

It should be noted that, when the another data node continuously accesses data in a plurality of memory addresses of the first data node, a case in which data in every N memory addresses in the plurality of memory addresses are accessed by the second data node may be recorded in a directory entry. In this case, a larger value of N indicates that a larger cache capacity is saved. However, if a quantity of consecutive memory addresses accessed by the another data node is relatively small, in this case, if the value of N is set to be relatively large, a case in which an existing directory entry cannot be reused occurs relatively much. Therefore, the value of N may be set based on a specific application scenario. In a specific example of this embodiment of this application, N is usually set to 4, mainly considering that 4 may be expressed in a form of $2^2$. To be specific, the first associated address information may be expressed by using 2 bits, and when N=4, N is applicable to most application scenarios. Certainly, N may also be set to another value. This is not specifically limited in this embodiment of this application.

It should also be noted that, although in the case 2, the case 3, and the case 4, a new directory entry needs to be created to record a case in which another data node accesses the data of the first data node, during actual implementation, because of spatial locality of a read program, access of the another data node to the first data node is usually access to a plurality of consecutive memory addresses. Therefore, in most scenarios, a manner described in the case 1 may be used, to be specific, a manner of reusing the first directory entry is used to record a case in which the another data node accesses the first data node. Therefore, using a directory processing manner provided in this embodiment of this application can achieve an effect of reducing the cache occupied by the directory.

According to the directory processing method provided in this embodiment of this application, the created first directory entry includes the first indication information, the first indication information includes the N indication bits, and the data in the memory address corresponding to the indication bit that is set to valid in the N indication bits is accessed by the second data node. Therefore, the first directory entry not only can record a case in which the data in the first memory address is accessed by the second data node, but also can record a case in which another memory address other than the first memory address in the N memory addresses is accessed by the second data node. In other words, compared with the prior art, although the first directory entry created in this embodiment of this application includes the first indication information, and the first indication information occupies several bits (for example, occupies N bits), a directory entry created in the prior art may be used only to record a case in which data in a memory address is accessed by the second data node, but the first directory entry created in this embodiment of this application may be used to record a case in which data in N memory addresses is accessed by the second data node. Therefore, according to the directory processing method provided in this embodiment of this application, a cache capacity occupied by a directory can be reduced, and a resource waste can be reduced.

Particularly, when the second data node continuously accesses data in a plurality of memory addresses on the first data node, the data in the plurality of memory addresses is accessed by a same data node, and access requests have a same type. Therefore, a case in which every N memory addresses in the plurality of memory addresses are accessed by the second data node may be recorded in a directory entry, to reduce the cache occupied by the directory to a greater extent.

Based on the foregoing embodiment, an embodiment of this application further provides a directory processing method. The directory processing method may be considered as a specific example of the method shown in FIG. 5.

Figures 13, 14:
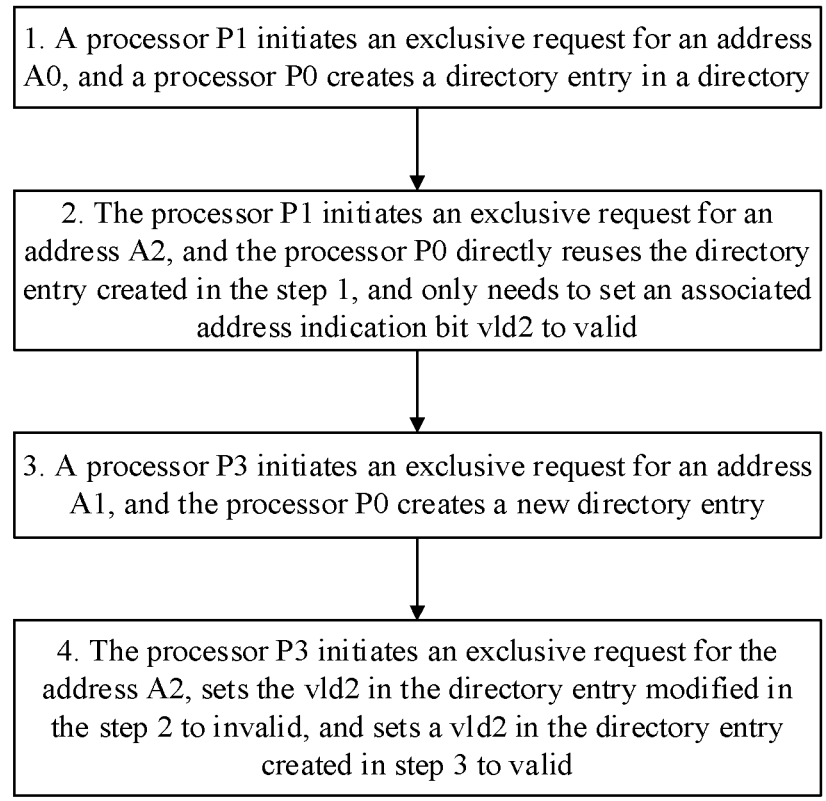
FIG. 13 is a schematic flowchart of another directory processing method according to an embodiment of this application.
FIG. 14 is a schematic diagram of a structure of a first directory entry according to an embodiment of this application.

The method is applied to a storage system including 256 processors. In this method, fields used for searching a directory in a physical address PA are TagA and IndexA respectively, and associated addresses are memory addresses A0 to A3 of a processor P0. The processor P0 is a specific example of the foregoing first data node. Referring to FIG. 13, the method includes the following operations.

1. A processor P1 initiates an exclusive request for the address A0, and the processor P0 creates a directory entry in the directory to record the TagA. An associated address indication bit vld0 is set to valid, and content of the directory entry is E@P1.

Specifically, a physical address corresponding to the exclusive request initiated by the processor P1 for the address A0 and a directory entry created based on the exclusive request are shown in FIG. 14. In FIG. 14, E represents that the request initiated by the processor P1 is an exclusive request, P1 represents that the processor that initiates the request is the processor P1, and that the associated address indication bit vld0 is set to valid represents that the processor P1 exclusively occupies data in the A0.

The vld0 is a specific example of the foregoing first indication bit. In the directory entry shown in FIG. 14, because the storage system includes 256 processors, ptr (a specific example of the foregoing first pointer information) in the content of the directory entry occupies 8 bits. Because a request type includes three types: exclusive, single-shared, and multi-shared, sta (a specific example of the foregoing first status information) in the content of the directory entry occupies 2 bits. Because there are four associated memory addresses A0 to A3, first indication information (including vld0, vld1, vld2, and vld3) occupies 4 bits. In addition, a tag occupies 27 bits.

2. The processor P1 initiates an exclusive request for the address A2, and if the processor P0 finds, after searching the directory, that the TagA matches the directory entry shown in FIG. 14, and an associated address indication bit vld2 is set to be invalid, the processor P0 creates, after the processor P1 obtains data, a directory entry related to the A2 for the processor P1. Because the content (E@P1) of the directory entry is completely the same as that of the directory entry (namely, the directory entry shown in FIG. 14) created in the operation 1, the directory entry (namely, the directory entry shown in FIG. 14) created in the operation 1 may be directly reused, provided that the associated address indication bit vld2 is set to valid.

Specifically, a physical address corresponding to the exclusive request initiated by the processor P1 for the address A2 and a directory entry modified based on the request are shown in FIG. 15.

3. A processor P3 initiates an exclusive request for the address A1, and if the processor P0 finds, after searching the directory, that the Tag A matches the directory entry (the directory entry shown in FIG. 15) modified in the operation 2, but content of the directory entry of the directory is E@P1, and the directory entry shown in FIG. 15 cannot be reused because content of a corresponding directory entry should be E@P3 after the processor P3 initiates the exclusive request for the address A1, the processor P0 needs to create a new directory entry.

Specifically, a physical address corresponding to the exclusive request initiated by the processor P3 for the address A1 and a directory entry created based on the request are shown in FIG. 16. In FIG. 16, E represents that the request initiated by the processor P3 is an exclusive request, P3 represents that the processor that initiates the request is the processor P3, and that an associated address indication bit vld1 is set to valid represents that the processor P3 exclusively occupies data in the A1.

In this case, both the directory entry shown in FIG. 15 and the directory entry shown in FIG. 16 are stored in a cache of the processor P0 at the same time.

4. The processor P3 initiates an exclusive request for the address A2, and after finding, by searching the directory, that data in the address A2 is exclusively occupied by the processor P1, the processor P0 needs to initiate listening for protocol processing. After protocol processing is completed (to be specific, after the processor P3 obtains the data in the address A2), the data in the A2 address that is cached by the processor P1 is invalid. The data is exclusively occupied by the processor P3, and a directory entry that points to exclusive occupation of the P3 needs to be created for the address A2. In this case, the vld2 in the directory entry (namely, the directory entry shown in FIG. 15) modified in the operation 2 may be set to invalid, and the vld2 in the directory entry (namely, the directory entry shown in FIG. 16) created in the operation 3 may be set to valid, to implement the foregoing process, without creating a new directory entry.

Figure 17:
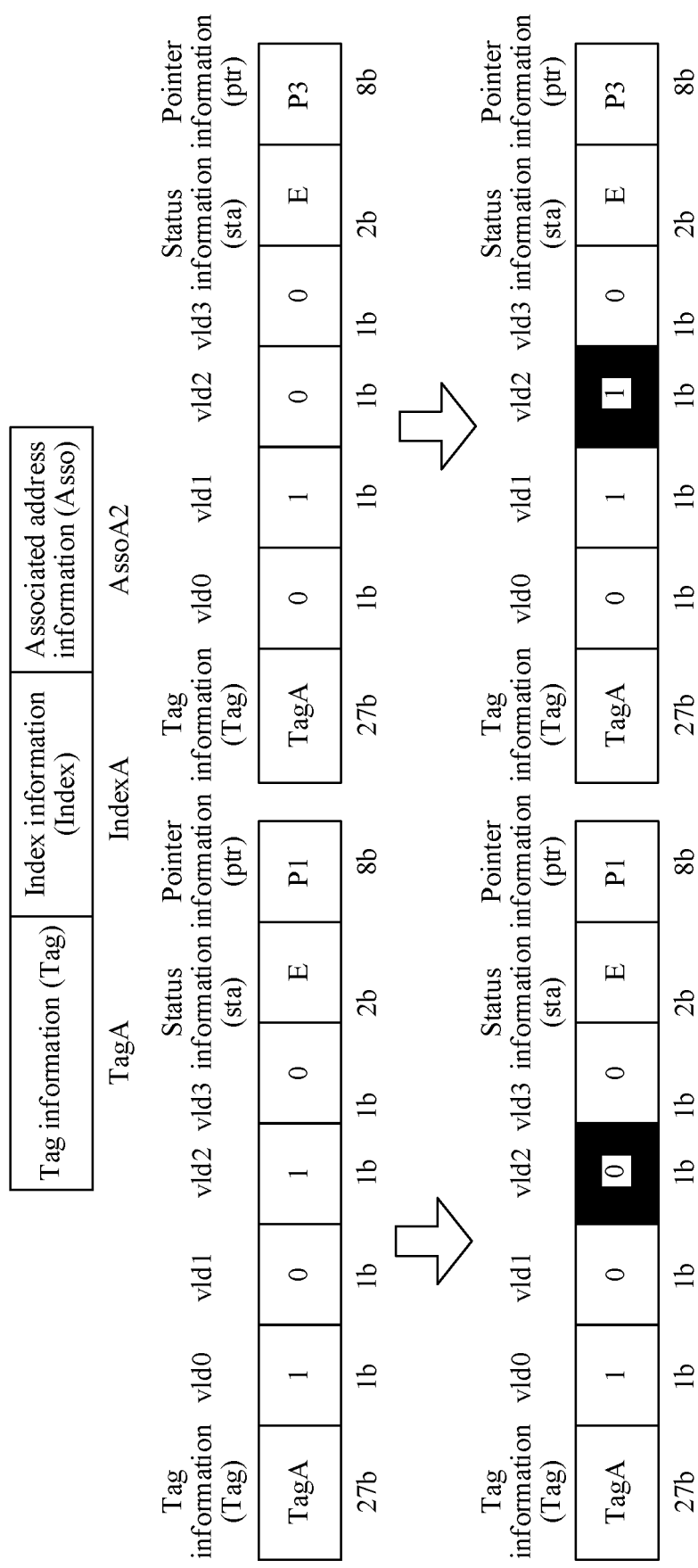
FIG. 17 is a schematic diagram of a structure of a fourth directory entry according to an embodiment of this application.

Specifically, a process of setting the vld2 in the directory entry shown in FIG. 15 to be invalid and setting the vld2 in the directory entry shown in FIG. 16 to be valid may be shown in FIG. 17.

It should be noted that the method shown in FIG. 13 is a specific example of the method shown in FIG. 5. For an implementation not described in detail in the method shown in FIG. 13, refer to related descriptions in the method shown in FIG. 5.

Figure 18:
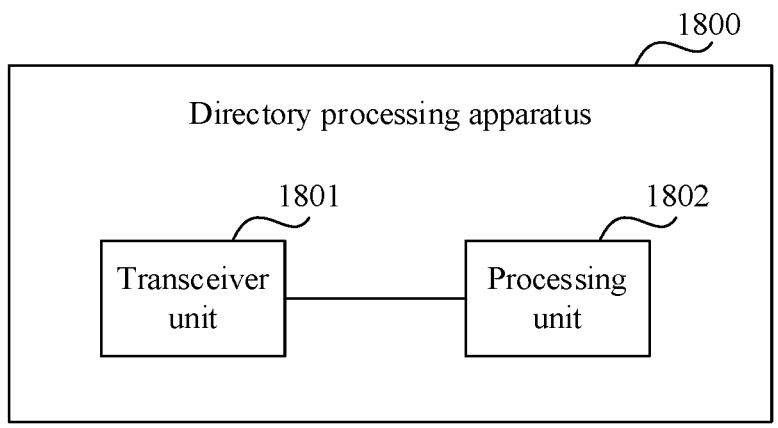
FIG. 18 is a schematic diagram of a structure of a directory processing apparatus according to an embodiment of this application.

Based on a same inventive concept, an embodiment of this application further provides a directory processing apparatus. The directory processing apparatus may implement the method provided in the embodiment corresponding to FIG. 5. Referring to FIG. 18, the directory processing apparatus 1800 includes:

a transceiver unit 1801, configured to receive a first request sent by a second data node, where the first request is used to indicate that the second data node requests to read first data in a first physical address, the first physical address includes tag information, index information, and first associated address information, the first associated address information is used to indicate that the first physical address corresponds to a first memory address in N memory addresses of a memory of the apparatus 1800, and N is greater than 1; and a processing unit 1802, configured to search for a matched directory entry in a directory of the apparatus 1800 based on the tag information and the index information.

The processing unit 1802 is further configured to create, when no matched directory entry is found, a first directory entry of the directory based on the first request. The first directory entry includes the tag information, first indication information, first pointer information, and first status information. The first indication information includes N indication bits that are in one-to-one correspondence with the N memory addresses, a first indication bit corresponding to the first memory address in the N indication bits is set to valid, and the other indication bits other than the first indication bit are set to invalid. The first pointer information is used to indicate that data in the memory address corresponding to the indication bit that is set to valid in the first indication information is read by the second data node.

In one embodiment, the first status information is used to indicate a type of the first request, and the type of the first request is an exclusive request or a share request.

In one embodiment, the transceiver unit 1801 is further configured to, after the processing unit 1802 creates the first directory entry of the directory based on the first request, receive a second request sent by the second data node. A type of the second request is the same as the type of the first request. The second request is used to indicate that the second data node requests to read second data in a second physical address. The second physical address includes the tag information, the index information, and second associated address information. The second associated address information is used to indicate that the second physical address corresponds to a second memory address in the N memory addresses.

The processing unit 1802 is further configured to: search for a matched directory entry in the directory based on the second request, to find the first directory entry; and set, based on the second request, a second indication bit corresponding to the second memory address in the first indication information to valid.

In one embodiment, when searching for a matched directory entry in the directory based on the second request, to find the first directory entry, the processing unit 1802 is specifically configured to: search for the first directory entry based on the tag information and the index information; determine that a data node indicated by first pointer information in the first directory entry is the second data node that sends the second request, and determine that the type of the first request indicated by the first status information in the first directory entry is the same as the type of the second request; and determine the first directory entry as the matched directory entry.

In one embodiment, the transceiver unit 1801 is further configured to, after the processing unit 1802 creates the first directory entry of the directory based on the first request, receive a third request sent by the second data node. A type of the third request is different from the type of the first request. The third request is used to indicate that the second data node requests to read third data in a third physical address. The third physical address includes the tag information, the index information, and third associated address information. The third associated address information is used to indicate that the third physical address corresponds to a third memory address in the N memory addresses.

The processing unit 1802 is further configured to: search for a matched directory entry in the directory based on the third request; and create, when no matched directory entry is found, a second directory entry of the directory based on the third request. The second directory entry includes the tag information, second indication information, second pointer information, and second status information. The second indication information includes N indication bits that are in one-to-one correspondence with the N memory addresses, a third indication bit corresponding to the third memory address in the N indication bits is set to valid, and the other indication bits other than the third indication bit are set to invalid. The second pointer information is used to indicate that data in the memory address corresponding to the indication bit that is set to valid in the second indication information is read by the second data node. The second status information is used to indicate the type of the third request.

In one embodiment, when searching for a matched directory entry in the directory based on the third request, the processing unit 1802 is specifically configured to: search for the first directory entry based on the tag information and the index information; determine that the data node indicated by first pointer information in the first directory entry is the second data node that sends the third request, and determine that the type of the first request indicated by the first status information in the first directory entry is different from the type of the third request; and determine that no matched directory entry is found.

In one embodiment, the transceiver unit 1801 is further configured to, after the processing unit 1802 creates the first directory entry of the directory based on the first request, receive a fourth request sent by a third data node. The fourth request is used to indicate that the third data node requests to read fourth data in a fourth physical address. The fourth physical address includes the tag information, the index information, and fourth associated address information. The fourth associated address information is used to indicate that the fourth physical address corresponds to a fourth memory address in the N memory addresses.

The processing unit 1802 is further configured to: search for a matched directory entry in the directory based on the fourth request; and create, when no matched directory entry is found, a third directory entry of the directory based on the fourth request. The third directory entry includes the tag information, third indication information, third pointer information, and third status information. The third indication information includes N indication bits that are in one-to-one correspondence with the N memory addresses, a fourth indication bit corresponding to the fourth memory address in the N indication bits is set to valid, and the other indication bits other than the fourth indication bit are set to invalid. The third pointer information is used to indicate that data stored in the memory address corresponding to the indication bit that is set to valid in the third indication information is read by the third data node. The third status information is used to indicate a type of the fourth request.

In one embodiment, when searching for a matched directory entry in the directory based on the fourth request, the processing unit 1802 is specifically configured to: search for the first directory entry based on the tag information and the index information; determine that the data node indicated by the first pointer information in the first directory entry is not the third data node that sends the fourth request; and determine that no matched directory entry is found.

In one embodiment, the transceiver unit 1801 is further configured to, after the processing unit 1802 creates the first directory entry of the directory based on the first request, receive a fifth request sent by a fourth data node. The fifth request is used to indicate that the fourth data node requests to read the first data.

The processing unit 1802 is further configured to search for a matched directory entry in the directory based on the fifth request, to find the first directory entry.

The transceiver unit 1801 is further configured to: after the processing unit 1802 determines, based on the first directory entry, that the first data is read by the second data node, notify the fourth data node to initiate listening to the second data node, to read the first data.

In one embodiment, the processing unit 1802 is further configured to: after the transceiver unit 1801 notifies the fourth data node to initiate listening to the second data node, if a type of the fifth request is an exclusive request, set the first indication bit in the first indication information to invalid based on the fifth request, and create a fourth directory entry of the directory, where the fourth directory entry includes the tag information, fourth indication information, fourth pointer information, and fourth status information, the fourth indication information includes N indication bits that are in one-to-one correspondence with the N memory addresses, a first indication bit corresponding to the first memory address in the N indication bits is set to valid, the other indication bits other than the first indication bit are set to invalid, the fourth pointer information is used to indicate that data in the memory address corresponding to the indication bit that is set to valid in the fourth indication information is read by the fourth data node, and the fourth status information is used to indicate the type of the fifth request; or after the transceiver unit 1801 notifies the fourth data node to initiate listening to the second data node, if a type of the fifth request is a share request and the type of the first request is a share request, create a fifth directory entry of the directory based on the fifth request, where the fifth directory entry includes the tag information, fifth indication information, fifth pointer information, and fifth status information, the fifth indication information includes N indication bits that are in one-to-one correspondence with the N memory addresses, a first indication bit corresponding to the first memory address in the N indication bits is set to valid, the other indication bits other than the first indication bit are set to invalid, the fifth pointer information is used to indicate that data in the memory address corresponding to the indication bit that is set to valid in the fifth indication information is read by the fourth data node, and the fifth status information is used to indicate the type of the fifth request; or after the transceiver unit 1801 notifies the fourth data node to initiate listening to the second data node, if a type of the fifth request is a share request and the type of the first request is an exclusive request, set the first indication bit in the first indication information to invalid based on the fifth request, and create a sixth directory entry and a seventh directory entry of the directory based on the fifth request, where the sixth directory entry includes the tag information, sixth indication information, sixth pointer information, and sixth status information, the sixth indication information includes N indication bits that are in one-to-one correspondence with the N memory addresses, a first indication bit corresponding to the first memory address in the N indication bits is set to valid, the other indication bits other than the first indication bit are set to invalid, the sixth pointer information is used to indicate that data stored in the memory address corresponding to the indication bit that is set to valid in the sixth indication information is read by the fourth data node, and the sixth status information is used to indicate the type of the fifth request; and the seventh directory entry includes the tag information, seventh indication information, seventh pointer information, and seventh status information, the seventh indication information includes N indication bits in one-to-one correspondence with the N memory addresses, a first indication bit in the N indication bits is set to valid, the other indication bits other than the first indication bit is set to invalid, the seventh pointer information is used to indicate that data stored in the memory address corresponding to the indication bit that is set to valid in the seventh indication information is read by the second data node, and the seventh status information is used to indicate the type of the fifth request.

It should be noted that, in this embodiment of this application, unit division is an example, and is merely logical function division. In actual implementation, another division manner may be used. Functional units in this embodiment of this application may be integrated into one processing unit, or each of the units may exist alone physically, or two or more units are integrated into one unit. The integrated units may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the operations of the methods described in the embodiments of this application. The foregoing storage medium includes any medium that can store program code, such as a USB flash drive, a removable hard disk, a ROM, a RAM, a magnetic disk, or an optical disc.

It should also be noted that the directory processing apparatus 1800 may implement the method provided in the embodiment corresponding to FIG. 5. For an implementation that is not described in detail in the directory processing apparatus 1800, refer to related descriptions in the method provided in the embodiment corresponding to FIG. 5.

By using the directory processing apparatus 1800, the first directory entry created by the processing unit 1802 includes the first indication information, the first indication information includes the N indication bits, and the data in the memory address corresponding to the indication bit that is set to valid in the N indication bits is accessed by the second data node. Therefore, the first directory entry not only can record a case in which the data in the first memory address is accessed by the second data node, but also can record a case in which another memory address other than the first memory address in the N memory addresses is accessed by the second data node. In other words, compared with the prior art, although the first directory entry created by the directory processing apparatus 1800 includes the first indication information, and the first indication information occupies several bits (for example, occupies N bits), a directory entry created in the prior art may be used only to record a case in which data in a memory address is accessed by the second data node, but the first directory entry created by the directory processing apparatus 1800 may be used to record a case in which data in N memory addresses is accessed by the second data node. Therefore, creating a directory entry by using the directory processing apparatus 1800 can reduce a cache capacity occupied by the directory, and reduce a resource waste.

Particularly, when the second data node continuously accesses data in a plurality of memory addresses, the data in the plurality of memory addresses is accessed by a same data node, and access requests have a same type. Therefore, the processing unit 1802 may record a case in which every N memory addresses in the plurality of memory addresses are accessed by the second data node in a directory entry, to reduce the cache occupied by the directory to a greater extent.

Figure 19:
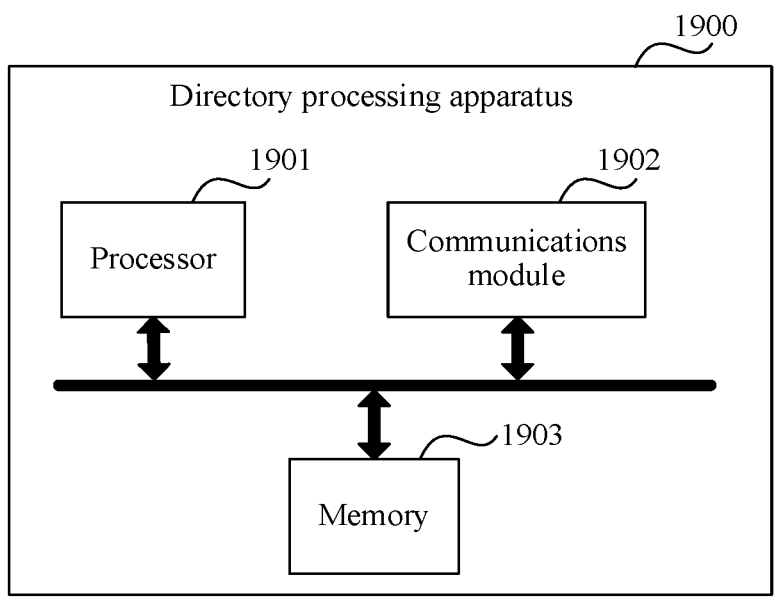
FIG. 19 is a schematic diagram of a structure of another directory processing apparatus according to an embodiment of this application.

Based on a same inventive concept, an embodiment of this application further provides a directory processing apparatus. The directory processing apparatus uses the method provided in the embodiment corresponding to FIG. 5, and may be a device that is the same as the directory processing apparatus 1800 shown in FIG. 18. Referring to FIG. 19, the directory processing apparatus 1900 includes: a processor 1901, a communications module 1902, and a memory 1903.

The processor 1901 is configured to read a program in the memory 1903, to perform the following processes:

receiving, by using the communications module 1902, a first request sent by a second data node, where the first request is used to indicate that the second data node requests to read first data in a first physical address, the first physical address includes tag information, index information, and first associated address information, the first associated address information is used to indicate that the first physical address corresponds to a first memory address in N memory addresses of a memory of the apparatus, and N is greater than 1;

then, searching for a matched directory entry in a directory of the apparatus 1900 based on the tag information and the index information; and then, when no matched directory entry is found, creating a first directory entry of the directory based on the first request, where the first directory entry includes the tag information, first indication information, first pointer information, and first status information, the first indication information includes N indication bits that are in one-to-one correspondence with the N memory addresses, a first indication bit corresponding to the first memory address in the N indication bits is set to valid, the other indication bits other than the first indication bit are set to invalid, and the first pointer information is used to indicate that data in the memory address corresponding to the indication bit that is set to valid in the first indication information is read by the second data node.

In one embodiment, the first status information is used to indicate a type of the first request, and the type of the first request is an exclusive request or a share request.

In one embodiment, the processor 1901 is further configured to:

after creating the first directory entry of the directory based on the first request, receive, by using the communications module 1902, a second request sent by the second data node, where a type of the second request is the same as the type of the first request, the second request is used to indicate that the second data node requests to read second data in a second physical address, the second physical address includes the tag information, the index information, and second associated address information, and the second associated address information is used to indicate that the second physical address corresponds to a second memory address in the N memory addresses;

then, search for a matched directory entry in the directory based on the second request, to find the first directory entry; and then, set, based on the second request, a second indication bit corresponding to the second memory address in the first indication information to valid.

In one embodiment, when searching for a matched directory entry in the directory based on the second request, to find the first directory entry, the processor 1901 is specifically configured to: search for the first directory entry based on the tag information and the index information; then, determine that a data node indicated by first pointer information in the first directory entry is the second data node that sends the second request, and determine that the type of the first request indicated by the first status information in the first directory entry is the same as the type of the second request; and determine the first directory entry as the matched directory entry.

In one embodiment, the processor 1901 is further configured to: after creating the first directory entry of the directory based on the first request, receive, by using the communications module 1902, a third request sent by the second data node, where a type of the third request is different from the type of the first request, the third request is used to indicate that the second data node requests to read third data in a third physical address, the third physical address includes the tag information, the index information, and third associated address information, and the third associated address information is used to indicate that the third physical address corresponds to a third memory address in the N memory addresses;

then, search for a matched directory entry in the directory based on the third request; and then, create, when no matched directory entry is found, a second directory entry of the directory based on the third request, where the second directory entry includes the tag information, second indication information, second pointer information, and second status information, the second indication information includes N indication bits that are in one-to-one correspondence with the N memory addresses, a third indication bit corresponding to the third memory address in the N indication bits is set to valid, the other indication bits other than the third indication bit are set to invalid, the second pointer information is used to indicate that data in the memory address corresponding to the indication bit that is set to valid in the second indication information is read by the second data node, and the second status information is used to indicate the type of the third request.

In one embodiment, when searching for a matched directory entry in the directory based on the third request, the processor 1901 is specifically configured to: search for the first directory entry based on the tag information and the index information; determine that the data node indicated by first pointer information in the first directory entry is the second data node that sends the third request, and determine that the type of the first request indicated by the first status information in the first directory entry is different from the type of the third request; and determine that no matched directory entry is found.

In one embodiment, the processor 1901 is further configured to: after creating the first directory entry of the directory based on the first request, receive, by using the communications module 1902, a fourth request sent by a third data node, where the fourth request is used to indicate that the third data node requests to read fourth data in a fourth physical address, the fourth physical address includes the tag information, the index information, and fourth associated address information, and the fourth associated address information is used to indicate that the fourth physical address corresponds to a fourth memory address in the N memory addresses;

then, search for a matched directory entry in the directory based on the fourth request; and then, create, when no matched directory entry is found, a third directory entry of the directory based on the fourth request, where the third directory entry includes the tag information, third indication information, third pointer information, and third status information, the third indication information includes N indication bits that are in one-to-one correspondence with the N memory addresses, a fourth indication bit corresponding to the fourth memory address in the N indication bits is set to valid, the other indication bits other than the fourth indication bit are set to invalid, the third pointer information is used to indicate that data stored in the memory address corresponding to the indication bit that is set to valid in the third indication information is read by the third data node, and the third status information is used to indicate a type of the fourth request.

In one embodiment, when searching for a matched directory entry in the directory based on the fourth request, the processor 1901 is specifically configured to: search for the first directory entry based on the tag information and the index information; determine that the data node indicated by the first pointer information in the first directory entry is not the third data node that sends the fourth request; and determine that no matched directory entry is found.

In one embodiment, the processor 1901 is further configured to: after creating the first directory entry of the directory based on the first request, receive, by using the communications module 1902, a fifth request sent by a fourth data node, where the fifth request is used to indicate that the fourth data node requests to read the first data; then, search for a matched directory entry in the directory based on the fifth request, to find the first directory entry; and then, after the processor 1901 determines, based on the first directory entry, that the first data is read by the second data node, notify, by using the communications module 1902, the fourth data node to initiate listening to the second data node, to read the first data.

In one embodiment, the processor 1901 is further configured to: after notifying, by using the communications module 1902, the fourth data node to initiate listening to the second data node, if a type of the fifth request is an exclusive request, set the first indication bit in the first indication information to invalid based on the fifth request, and create a fourth directory entry of the directory, where the fourth directory entry includes the tag information, fourth indication information, fourth pointer information, and fourth status information, the fourth indication information includes N indication bits that are in one-to-one correspondence with the N memory addresses, a first indication bit corresponding to the first memory address in the N indication bits is set to valid, the other indication bits other than the first indication bit are set to invalid, the fourth pointer information is used to indicate that data in the memory address corresponding to the indication bit that is set to valid in the fourth indication information is read by the fourth data node, and the fourth status information is used to indicate the type of the fifth request; or after notifying, by using the communications module 1902, the fourth data node to initiate listening to the second data node, if a type of the fifth request is a share request and the type of the first request is a share request, create a fifth directory entry of the directory based on the fifth request, where the fifth directory entry includes the tag information, fifth indication information, fifth pointer information, and fifth status information, the fifth indication information includes N indication bits that are in one-to-one correspondence with the N memory addresses, a first indication bit corresponding to the first memory address in the N indication bits is set to valid, the other indication bits other than the first indication bit are set to invalid, the fifth pointer information is used to indicate that data in the memory address corresponding to the indication bit that is set to valid in the fifth indication information is read by the fourth data node, and the fifth status information is used to indicate the type of the fifth request; or after notifying, by using the communications module 1902, the fourth data node to initiate listening to the second data node, if a type of the fifth request is a share request and the type of the first request is an exclusive request, set the first indication bit in the first indication information to invalid based on the fifth request, and create a sixth directory entry and a seventh directory entry of the directory based on the fifth request, where the sixth directory entry includes the tag information, sixth indication information, sixth pointer information, and sixth status information, the sixth indication information includes N indication bits that are in one-to-one correspondence with the N memory addresses, a first indication bit corresponding to the first memory address in the N indication bits is set to valid, the other indication bits other than the first indication bit are set to invalid, the sixth pointer information is used to indicate that data stored in the memory address corresponding to the indication bit that is set to valid in the sixth indication information is read by the fourth data node, and the sixth status information is used to indicate the type of the fifth request; and the seventh directory entry includes the tag information, seventh indication information, seventh pointer information, and seventh status information, the seventh indication information includes N indication bits in one-to-one correspondence with the N memory addresses, a first indication bit in the N indication bits is set to valid, the other indication bits other than the first indication bit is set to invalid, the seventh pointer information is used to indicate that data stored in the memory address corresponding to the indication bit that is set to valid in the seventh indication information is read by the second data node, and the seventh status information is used to indicate the type of the fifth request.

In a possible implementation, the processor 1901 may be a processor such as a CPU, a GPU, an AIP, an application-specific integrated circuit ASIC), a field-programmable gate array (FPGA), or a complex programmable logic device (CPLD), or may be a processor core. This is not limited in this application. When the processor 1901 is a processor such as a CPU, a GPU, or an AIP, the first data node and the second data node may respectively belong to different entity devices. When the processor 1901 is a processor core, the first data node and the second data node may be considered as two processor cores in a same entity device.

In the apparatus 1900, the processor 1901, the communications module 1902, and the memory 1903 may be implemented by using a bus as a general bus architecture. According to constraint conditions of a specific application and an overall design of the directory processing apparatus 1900, the bus may include any quantity of interconnected buses and bridges, and specifically, various circuits of one or a plurality of processors represented by the processor 1901 and a memory represented by the memory 1903 are connected together. The bus architecture may further connect various other circuits such as a peripheral device, a voltage stabilizer, and a power management circuit. These are well known in the art, and therefore are not further described in this specification. A bus interface provides an interface. The communications module 1902 may be a plurality of elements, to be specific, includes a sender and a receiver, or includes a communications interface. The communications interface has a receiving function and a sending function, and provides a unit configured to communicate with various other apparatuses on a transmission medium. The processor 1901 is responsible for managing a bus architecture and normal processing. The memory 1903 may store data used when the processor 1901 is performing an operation.

Figure 20:
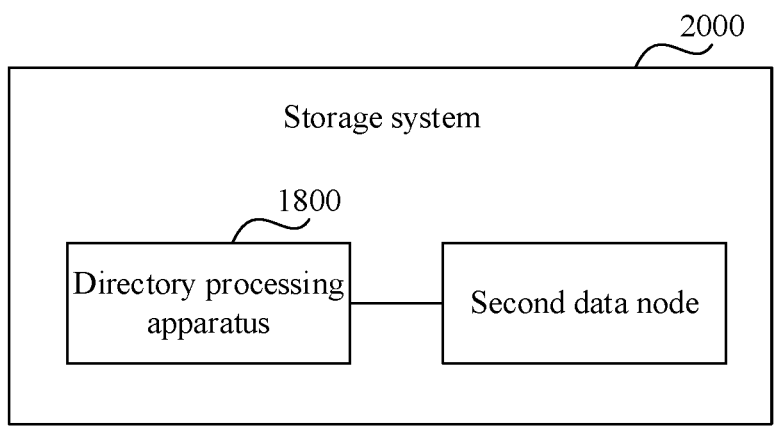
FIG. 20 is a schematic diagram of a structure of another storage system according to an embodiment of this application.

Based on the foregoing embodiments, this application further provides a storage system. Referring to FIG. 20, the storage system 2000 includes the directory processing apparatus 1800 shown in FIG. 18 and a second data node that interacts with the directory processing apparatus.

In conclusion, the embodiments of this application provide a directory processing method and apparatus, and a system. According to the solutions provided in the embodiments of this application, a cache capacity occupied by a directory can be reduced, and a resource waste can be reduced.

This application is described with reference to the flowcharts and/or the block diagrams of the method, the device (system), and the computer program product based on this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Definitely, a person skilled in the art can make various modifications and variations to this application without departing from the spirit and scope of this application. This application is intended to cover these modifications and variations of this application provided that they fall within the scope of protection defined by the following claims and their equivalent technologies.

All or some of the foregoing embodiments may be implemented by means of software, hardware, firmware, or any combination thereof. When the embodiments are implemented by using software, all or some of the embodiments may be implemented in a form of a computer program product. The computer program product includes one or more computer instructions. When the computer program instruction is loaded and executed on a computer, the procedure or function according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable mediums. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A directory processing method, comprising:
    receiving, by a first data node, a first request sent by a second data node, wherein the first request is used to indicate that the second data node requests to read first data in a first physical address, wherein the first physical address comprises tag information, index information, and first associated address information, wherein the first associated address information is used to indicate that the first physical address corresponds to a first memory address in N memory addresses of a memory of the first data node, wherein a quantity of bits occupied by the first associated address information is related to N, and wherein N is greater than 1;
    searching for, by the first data node, a matched directory entry in a directory of the first data node based on the tag information and the index information; and
    creating, by the first data node when no matched directory entry is found, a first directory entry of the directory based on the first request, wherein the first directory entry comprises the tag information, first indication information, first pointer information, and first status information, wherein the first indication information comprises N indication bits that are in one-to-one correspondence with the N memory addresses, wherein a first indication bit corresponding to the first memory address in the N indication bits is set to valid, wherein the other indication bits other than the first indication bit are set to invalid, wherein the first pointer information is used to indicate that data in the memory address corresponding to the indication bit that is set to valid in the first indication information is read by the second data node, and wherein the first status information is used to indicate a type of the first request, and wherein the type of the first request is an exclusive request or a share request.

2. The method according to claim 1, wherein after the creating, by the first data node, a first directory entry of the directory based on the first request, the method further comprises:
    receiving, by the first data node, a second request sent by the second data node, wherein a type of the second request is the same as the type of the first request, the second request is used to indicate that the second data node requests to read second data in a second physical address, wherein the second physical address comprises the tag information, the index information, and second associated address information, and wherein the second associated address information is used to indicate that the second physical address corresponds to a second memory address in the N memory addresses;
    searching for, by the first data node, a matched directory entry in the directory based on the second request, to find the first directory entry; and
    setting, by the first data node based on the second request, a second indication bit corresponding to the second memory address in the first indication information to valid.

3. The method according to claim 2, wherein the searching for, by the first data node, a matched directory entry in the directory based on the second request, to find the first directory entry comprises:
    searching for, by the first data node, the first directory entry based on the tag information and the index information;
    determining, by the first data node, that a data node indicated by the first pointer information in the first directory entry is the second data node that sends the second request, and determining that the type of the first request indicated by the first status information in the first directory entry is the same as the type of the second request; and
    determining, by the first data node, the first directory entry as the matched directory entry.

4. The method according to claim 1, wherein after the creating, by the first data node, a first directory entry of the directory based on the first request, the method further comprises:
  receiving, by the first data node, a third request sent by the second data node, wherein a type of the third request is different from the type of the first request, wherein the third request is used to indicate that the second data node requests to read third data in a third physical address, wherein the third physical address comprises the tag information, the index information, and third associated address information, and wherein the third associated address information is used to indicate that the third physical address corresponds to a third memory address in the N memory addresses;
  searching for, by the first data node, a matched directory entry in the directory based on the third request; and
  creating, by the first data node when no matched directory entry is found, a second directory entry of the directory based on the third request, wherein the second directory entry comprises the tag information, second indication information, second pointer information, and second status information, wherein the second indication information comprises N indication bits that are in one-to-one correspondence with the N memory addresses, wherein a third indication bit corresponding to the third memory address in the N indication bits is set to valid, wherein the other indication bits other than the third indication bit are set to invalid, wherein the second pointer information is used to indicate that data in the memory address corresponding to the indication bit that is set to valid in the second indication information is read by the second data node, and wherein the second status information is used to indicate the type of the third request.

5. The method according to claim 4, wherein the searching for, by the first data node, a matched directory entry in the directory based on the third request comprises:
  searching for, by the first data node, the first directory entry based on the tag information and the index information;
  determining, by the first data node, that the data node indicated by the first pointer information in the first directory entry is the second data node that sends the third request, and determining that the type of the first request indicated by the first status information in the first directory entry is different from the type of the third request; and
  determining, by the first data node, that no matched directory entry is found.

6. The method according to claim 1, wherein after the creating, by the first data node, a first directory entry of the directory based on the first request, the method further comprises:
  receiving, by the first data node, a fourth request sent by a third data node, wherein the fourth request is used to indicate that the third data node requests to read fourth data in a fourth physical address, wherein the fourth physical address comprises the tag information, the index information, and fourth associated address information, and wherein the fourth associated address information is used to indicate that the fourth physical address corresponds to a fourth memory address in the N memory addresses;
  searching for, by the first data node, a matched directory entry in the directory based on the fourth request; and
  creating, by the first data node when no matched directory entry is found, a third directory entry of the directory based on the fourth request, wherein the third directory entry comprises the tag information, third indication information, third pointer information, and third status information, wherein the third indication information comprises N indication bits that are in one-to-one correspondence with the N memory addresses, wherein a fourth indication bit corresponding to the fourth memory address in the N indication bits is set to valid, wherein the other indication bits other than the fourth indication bit are set to invalid, wherein the third pointer information is used to indicate that data stored in the memory address corresponding to the indication bit that is set to valid in the third indication information is read by the third data node, and wherein the third status information is used to indicate a type of the fourth request.

7. The method according to claim 6, wherein the searching for, by the first data node, a matched directory entry in the directory based on the fourth request comprises:
  searching for, by the first data node, the first directory entry based on the tag information and the index information;
  determining, by the first data node, that the data node indicated by the first pointer information in the first directory entry is not the third data node that sends the fourth request; and
  determining, by the first data node, that no matched directory entry is found.

8. The method according to claim 1, wherein after the creating, by the first data node, a first directory entry of the directory based on the first request, the method further comprises:
  receiving, by the first data node, a fifth request sent by a fourth data node, wherein the fifth request is used to indicate that the fourth data node requests to read the first data;
  searching for, by the first data node, a matched directory entry in the directory based on the fifth request, to find the first directory entry; and
  after determining, based on the first directory entry, that the first data is read by the second data node, notifying, by the first data node, the fourth data node to initiate listening to the second data node, to read the first data.

9. A directory processing apparatus, comprising:
  a memory storage comprising instructions; and
  one or more processors in communication with the memory, wherein the one or more processors execute the instructions to:
  receive a first request sent by a second data node, wherein the first request is used to indicate that the second data node requests to read first data in a first physical address, wherein the first physical address comprises tag information, index information, and first associated address information, wherein the first associated address information is used to indicate that the first physical address corresponds to a first memory address in N memory addresses of a memory of the apparatus, wherein a quantity of bits occupied by the first associated address information is related to N, and wherein N is greater than 1;
  search for a matched directory entry in a directory of the apparatus based on the tag information and the index information; and
  create, when no matched directory entry is found, a first directory entry of the directory based on the first request, wherein the first directory entry comprises the tag information, first indication information, first pointer information, and first status information, wherein the first indication information comprises N indication bits that are in one-to-one correspondence with the N memory addresses, wherein a first indication bit corresponding to the first memory address in the N indication bits is set to valid, wherein the other indication bits other than the first indication bit are set to invalid, wherein the first pointer information is used to indicate that data in the memory address corresponding to the indication bit that is set to valid in the first indication information is read by the second data node, and wherein the first status information is used to indicate a type of the first request, and the type of the first request is an exclusive request or a share request.

10. The apparatus according to claim 9, wherein the one or more processors execute the instructions to:
after creating the first directory entry of the directory based on the first request, receive a second request sent by the second data node, wherein a type of the second request is the same as the type of the first request, wherein the second request is used to indicate that the second data node requests to read second data in a second physical address, wherein the second physical address comprises the tag information, the index information, and second associated address information, and wherein the second associated address information is used to indicate that the second physical address corresponds to a second memory address in the N memory addresses;
search for a matched directory entry in the directory based on the second request, to find the first directory entry; and
set, based on the second request, a second indication bit corresponding to the second memory address in the first indication information to valid.

11. The apparatus according to claim 10, wherein the one or more processors execute the instructions to:
search for the first directory entry based on the tag information and the index information;
determine that a data node indicated by the first pointer information in the first directory entry is the second data node that sends the second request, and determine that the type of the first request indicated by the first status information in the first directory entry is the same as the type of the second request; and
determine the first directory entry as the matched directory entry.

12. The apparatus according to claim 9, wherein the one or more processors execute the instructions to:
after creating the first directory entry of the directory based on the first request, receive a third request sent by the second data node, wherein a type of the third request is different from the type of the first request, wherein the third request is used to indicate that the second data node requests to read third data in a third physical address, wherein the third physical address comprises the tag information, the index information, and third associated address information, and wherein the third associated address information is used to indicate that the third physical address corresponds to a third memory address in the N memory addresses;
search for a matched directory entry in the directory based on the third request; and
create, when no matched directory entry is found, a second directory entry of the directory based on the third request, wherein the second directory entry comprises the tag information, second indication information, second pointer information, and second status information, wherein the second indication information comprises N indication bits that are in one-to-one correspondence with the N memory addresses, wherein a third indication bit corresponding to the third memory address in the N indication bits is set to valid, wherein the other indication bits other than the third indication bit are set to invalid, wherein the second pointer information is used to indicate that data in the memory address corresponding to the indication bit that is set to valid in the second indication information is read by the second data node, and wherein the second status information is used to indicate the type of the third request.

13. The apparatus according to claim 12, wherein the one or more processors execute the instructions to:
search for the first directory entry based on the tag information and the index information;
determine that the data node indicated by the first pointer information in the first directory entry is the second data node that sends the third request, and determine that the type of the first request indicated by the first status information in the first directory entry is different from the type of the third request; and
determine that no matched directory entry is found.

14. The apparatus according to claim 9, wherein the one or more processors execute the instructions to:
after creating the first directory entry of the directory based on the first request, receive a fourth request sent by a third data node, wherein the fourth request is used to indicate that the third data node requests to read fourth data in a fourth physical address, wherein the fourth physical address comprises the tag information, the index information, and fourth associated address information, and wherein the fourth associated address information is used to indicate that the fourth physical address corresponds to a fourth memory address in the N memory addresses;
search for a matched directory entry in the directory based on the fourth request; and
create, when no matched directory entry is found, a third directory entry of the directory based on the fourth request, wherein the third directory entry comprises the tag information, third indication information, third pointer information, and third status information, wherein the third indication information comprises N indication bits that are in one-to-one correspondence with the N memory addresses, wherein a fourth indication bit corresponding to the fourth memory address in the N indication bits is set to valid, wherein the other indication bits other than the fourth indication bit are set to invalid, wherein the third pointer information is used to indicate that data stored in the memory address corresponding to the indication bit that is set to valid in the third indication information is read by the third data node, and wherein the third status information is used to indicate a type of the fourth request.

15. The apparatus according to claim 14, wherein the one or more processors execute the instructions to:
search for the first directory entry based on the tag information and the index information;
determine that the data node indicated by the first pointer information in the first directory entry is not the third data node that sends the fourth request; and
determine that no matched directory entry is found.

16. The apparatus according to claim 9, wherein the one or more processors execute the instructions to:
- after creating the first directory entry of the directory based on the first request, receive a fifth request sent by a fourth data node, wherein the fifth request is used to indicate that the fourth data node requests to read the first data;
- search for a matched directory entry in the directory based on the fifth request, to find the first directory entry; and
- after determining, based on the first directory entry, that the first data is read by the second data node, notify the fourth data node to initiate listening to the second data node, to read the first data.

17. A non-transitory machine-readable medium having instructions stored therein, which when executed by a processor, cause the processor to perform operations, the operations comprising:
- receiving, by a first data node, a first request sent by a second data node, wherein the first request is used to indicate that the second data node requests to read first data in a first physical address, wherein the first physical address comprises tag information, index information, and first associated address information, wherein the first associated address information is used to indicate that the first physical address corresponds to a first memory address in N memory addresses of a memory of the first data node, wherein a quantity of bits occupied by the first associated address information is related to N, and wherein N is greater than 1;
- searching for, by the first data node, a matched directory entry in a directory of the first data node based on the tag information and the index information; and
- creating, by the first data node when no matched directory entry is found, a first directory entry of the directory based on the first request, wherein the first directory entry comprises the tag information, first indication information, first pointer information, and first status information, wherein the first indication information comprises N indication bits that are in one-to-one correspondence with the N memory addresses, wherein a first indication bit corresponding to the first memory address in the N indication bits is set to valid, wherein the other indication bits other than the first indication bit are set to invalid, wherein the first pointer information is used to indicate that data in the memory address corresponding to the indication bit that is set to valid in the first indication information is read by the second data node, and wherein the first status information is used to indicate a type of the first request, and wherein the type of the first request is an exclusive request or a share request.

* * * * *